United States Patent
Harada et al.

(10) Patent No.: US 10,233,324 B2
(45) Date of Patent: Mar. 19, 2019

(54) EPOXY RESIN COMPOSITION

(71) Applicant: Mitsubishi Chemical Corporation, Chiyoda-ku (JP)

(72) Inventors: Yukihiro Harada, Toyohashi (JP); Satoshi Okamoto, Toyohashi (JP); Kenta Narumori, Toyohashi (JP); Tomoo Sano, Toyohashi (JP); Akihiro Ito, Toyohashi (JP); Masayuki Sugiura, Toyohashi (JP); Tatsuhiro Kishikawa, Toyohashi (JP); Shinya Katou, Toyohashi (JP); Sanae Kita, Toyohashi (JP)

(73) Assignee: MITSUBISHI CHEMICAL CORPORATION, Chiyoda-ku (JP)

(*) Notice: Subject to any disclaimer, the term of this patent is extended or adjusted under 35 U.S.C. 154(b) by 240 days.

(21) Appl. No.: 14/402,147

(22) PCT Filed: Jun. 5, 2013

(86) PCT No.: PCT/JP2013/065574
§ 371 (c)(1),
(2) Date: Nov. 19, 2014

(87) PCT Pub. No.: WO2013/183667
PCT Pub. Date: Dec. 12, 2013

(65) Prior Publication Data
US 2015/0148451 A1    May 28, 2015

(30) Foreign Application Priority Data

Jun. 5, 2012   (JP) ................. 2012-128322
Mar. 27, 2013  (JP) ................. 2013-067300

(51) Int. Cl.
*C08L 63/00*   (2006.01)
*B32B 1/08*    (2006.01)
(Continued)

(52) U.S. Cl.
CPC ............... *C08L 63/00* (2013.01); *B32B 1/08* (2013.01); *B32B 15/14* (2013.01); *B32B 15/20* (2013.01);
(Continued)

(58) Field of Classification Search
CPC ...... C08L 63/00; C08L 2207/53; B32B 15/14; B32B 1/08; B32B 15/20; B32B 2260/046;
(Continued)

(56) References Cited

U.S. PATENT DOCUMENTS

| 3,676,200 A | 7/1972 | Rembold et al. |
| 5,593,770 A * | 1/1997 | Mumford ............... B29C 70/30 |
| | | 428/396 |

(Continued)

FOREIGN PATENT DOCUMENTS

| GB | 1 311 217 A | 3/1973 | |
| GB | 1587536 A * | 4/1981 | ............ C08G 59/68 |

(Continued)

OTHER PUBLICATIONS

Extended European Search Report dated May 18, 2015 in Patent Application No. 13800357.9.
(Continued)

*Primary Examiner* — Randy P Gulakowski
*Assistant Examiner* — Ha S Nguyen
(74) *Attorney, Agent, or Firm* — Oblon, McClelland, Maier & Neustadt, L.L.P.

(57) ABSTRACT

An epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1): component (A1): an epoxy resin; component (B1): a
(Continued)

boron trihalide-amine complex; and component (C1): rubber particles.

28 Claims, 2 Drawing Sheets

(51) Int. Cl.
  *B32B 15/20* (2006.01)
  *B32B 15/14* (2006.01)
  *C08G 59/40* (2006.01)
  *C08G 59/50* (2006.01)
  *C08G 59/72* (2006.01)
  *C08J 5/24* (2006.01)

(52) U.S. Cl.
  CPC ..... *C08G 59/4078* (2013.01); *C08G 59/5093* (2013.01); *C08G 59/72* (2013.01); *B32B 2260/021* (2013.01); *B32B 2260/046* (2013.01); *B32B 2307/306* (2013.01); *B32B 2307/54* (2013.01); *C08J 5/24* (2013.01); *C08J 2363/00* (2013.01); *C08J 2409/06* (2013.01); *C08J 2463/02* (2013.01); *C08L 2205/025* (2013.01); *C08L 2207/53* (2013.01)

(58) Field of Classification Search
  CPC .......... B32B 2307/306; B32B 2307/54; B32B 2260/021; C08G 59/5093; C08G 59/72; C08J 5/24; C08J 2409/06; C08J 2363/00
  See application file for complete search history.

(56) References Cited

U.S. PATENT DOCUMENTS

| | | | | |
|---|---|---|---|---|
| 2003/0064228 | A1* | 4/2003 | Oosedo | C08G 59/18 428/413 |
| 2007/0020405 | A1* | 1/2007 | Ochi | C08F 290/06 428/1.5 |
| 2008/0251203 | A1 | 10/2008 | Lutz et al. | |
| 2009/0198012 | A1 | 8/2009 | Sakata et al. | |
| 2010/0209642 | A1* | 8/2010 | Tomioka | B32B 27/38 428/36.9 |
| 2012/0071584 | A1 | 3/2012 | Lutz et al. | |
| 2012/0202071 | A1* | 8/2012 | Kaneko | B32B 27/38 428/413 |
| 2013/0281573 | A1 | 10/2013 | Goto et al. | |

FOREIGN PATENT DOCUMENTS

| | | | |
|---|---|---|---|
| JP | 03-269011 | 11/1991 | |
| JP | 5-239317 | 9/1993 | |
| JP | 07-278265 | 10/1995 | |
| JP | 08-073630 | 3/1996 | |
| JP | 08-219393 | 8/1996 | |
| JP | 9-031219 | 2/1997 | |
| JP | 09-176346 | 7/1997 | |
| JP | 10-81770 | 3/1998 | |
| JP | 11-171974 | 6/1999 | |
| JP | 2001354788 A * | 12/2001 | |
| JP | 2004-285292 | 10/2004 | |
| JP | 2005-335296 | 12/2005 | |
| JP | 2006-063173 | 3/2006 | |
| JP | 2006-272829 | 10/2006 | |
| JP | WO 2011037239 A1 * | 3/2011 | ............. B29C 43/12 |
| JP | WO 2011040567 A1 * | 4/2011 | ............. C08G 59/38 |
| JP | 2011-157491 | 8/2011 | |
| JP | 2012-025892 | 2/2012 | |
| JP | 2012025892 A * | 2/2012 | |
| JP | 2012-56980 | 3/2012 | |
| JP | 2012-063015 | 3/2012 | |
| WO | 2011-037239 | 3/2011 | |
| WO | 2011/039879 | 4/2011 | |
| WO | 2011/040567 | 4/2011 | |

OTHER PUBLICATIONS

International Search Report dated Sep. 10, 2013, in PCT/JP13/065574, filed Jun. 5, 2013.

* cited by examiner

EPOXY RESIN COMPOSITION

TECHNICAL FIELD

The present invention relates to an epoxy resin composition which has excellent storage stability, and produces a cured product having excellent toughness and heat resistance.

The present application claims priority based on Japanese Patent Application No. 2012-128322, filed in Japan on Jun. 5, 2012, and Japanese Patent Application No. 2013-067300, filed in Japan on Mar. 27, 2013, the disclosures of which are incorporated herein by reference.

BACKGROUND ART

In storage tanks for natural gas and hydrogen gas that are mounted in movable bodies such as automobiles, pressure vessels having their tank liners reinforced with a reinforced fiber composite material are utilized in view of the lightweightness of the storage tanks. Regarding the reinforcing fibers used therein, glass fiber, carbon fiber and the like can be used. Among them, carbon fiber has high specific strength and is highly advantageous in weight reduction of pressure vessels. Thus, carbon fiber is suitably used in storage tanks for hydrogen gas where higher pressure resistance performance is required as compared with storage tanks for natural gas.

A pressure vessel reinforced with a reinforcing fiber composite material is generally produced by filament winding molding (FW molding). That is, FW molding is a molding method of paralleling one or plural reinforcing fiber bundles, and during that process, continuously winding the reinforcing fiber bundles around a rotating tank liner at a desired tension and at a desired angle, while supplying a matrix resin to impregnate the reinforcing fiber bundles with the matrix resin. For the reinforcing fiber composite material, a tow prepreg obtained by impregnating a reinforcing fiber bundle with a resin in advance may also be used instead of the reinforcing fiber bundle. In this case, during the process of paralleling one or plural reinforcing fiber bundles, supply and impregnation of a matrix resin is not carried out, and the reinforcing fiber bundles are wound around a rotating tank liner at a desired tension and at a desired angle.

Regarding the matrix resin for the reinforcing fiber composite material that reinforces a pressure vessel, epoxy resin compositions having superior properties and good handleability are generally used. In regard to FW molding, the matrix resin for a reinforcing fiber composite material that reinforces a pressure vessel needs to be supplied to impregnate reinforcing fiber bundles during the process. Furthermore, also in the case of using a tow prepreg, it is necessary for the tow prepreg to have satisfactory reelability, processability, and drape properties. Accordingly, the matrix resin in the reinforcing fiber composite material that reinforces a pressure vessel needs to have very low viscosity compared with general epoxy resin compositions. From the reasons described above, acid anhydrides are widely used as curing agents for the epoxy resin composition (Patent Document 1, Patent Document 2, and Patent Document 3). An acid anhydride is a low-viscosity liquid curing agent, and can lower the viscosity of an epoxy resin composition.

However, an epoxy resin composition that has used an acid anhydride has a short pot life, and definitely cannot be used in intermediate materials such as a tow prepreg. Furthermore, even in a case in which an epoxy resin composition using an acid anhydride has been supplied during the process of FW molding, there is a need to diligently carry out maintenance of many facilities such as a kiss roll or a die for supplying a resin, a resin bus or a resin tank for collecting and holding a resin, and a pump or a piping for transporting a resin. Thus, this has been a cause for significantly deteriorating productivity.

Furthermore, when a solid curing agent such as dicyandiamide is used, an epoxy resin composition having a longer pot life compared with the case of an acid anhydride is obtained; however, there is a problem that the viscosity of the epoxy resin composition is increased. Also, when a solid curing agent is further used, voids are prone to be generated in the reinforcing fiber composite material, and the voids may cause deterioration of the performance of a pressure vessel, or the like (Patent Document 4).

CITATION LIST

Patent Document

Patent Document 1: JP 8-219393 A
Patent Document 2: JP 2012-56980 A
Patent Document 3: JP 2012-63015 A
Patent Document 4: JP 2011-157491 A

DISCLOSURE OF THE INVENTION

Problem to be Solved by the Invention

Under such circumstances, an object of the present invention is to provide an epoxy resin composition which has excellent storage stability, produces a cured product having excellent heat resistance and toughness, and can be suitably used in direct molding such as FW molding as well as in intermediate materials such as a tow prepreg; a tow prepreg having excellent reelability, processability and drape properties; and a pressure vessel having high pressure resistance performance.

Means for Solving Problem

In order to solve the problems described above, the present invention relates to the following.

[1] An epoxy resin composition, including components (A1) to (C1) described below,
the epoxy resin composition having a content of the component (B1) of 8 to 20 parts by mass relative to 100 parts by mass of the component (A1), and
a content of the component (C1) of 12 to 110 parts by mass relative to 100 parts by mass of the component (A1):
component (A1): an epoxy resin;
component (B1): a boron trihalide-amide complex; and
component (C1): rubber particles.

[2] The epoxy resin composition described in the above item [1], wherein the viscosity at 30° C. is from 0.1 Pa·s to 300 Pa·s.

[3] The epoxy resin composition described in the above item [1] or [2], wherein when the epoxy resin composition is cured, the particle size of the component (C1) in the cured product is 400 nm or less.

[4] The epoxy resin composition described in any one of the above items [1] to [3], wherein the component (C1) is rubber particles containing at least butadiene rubber.

[5] The epoxy resin composition described in any one of the above items [1] to [4], further including component (D1): a polymer which is compatible with the epoxy resin composition containing the components (A1) to (C1), and has a characteristic of forming a phase separation structure in a cured product obtainable when an epoxy resin composition including component (D1) is cured.

[6] The epoxy resin composition described in the above item [5], wherein the component (D1) is a triblock copolymer or a polyamide elastomer.

[7] The epoxy resin composition described in any one of the above items [1] to [6], wherein the component (B1) is a boron trichloride-amine complex.

[8] The epoxy resin composition described in any one of the above items [1] to [7], wherein the component (A1) is at least one component selected from the group consisting of an epoxy resin having an aromatic ring in the molecule, and hexahydrophthalic acid diglycidyl ester.

[9] An epoxy resin composition, including components (A2), (B2) and (D2) described below, the epoxy resin composition having a content of the component (B2) of 8 to 20 parts by mass relative to 100 parts by mass of the component (A2), and a content of the component (D2) of 1 to 50 parts by mass relative to 100 parts by mass of the component (A2):

component (A2): an epoxy resin;
component (B2): a boron trihalide-amine complex; and
component (D2): a polymer which is compatible with the epoxy resin composition containing the components (A2) and (B2), and has a characteristic of forming a phase separation structure in a cured product obtainable when an epoxy resin composition including component (D2) is cured.

[10] The epoxy resin composition described in the above item [9], wherein the viscosity at 30° C. is from 0.1 Pa·s to 300 Pa·s.

[11] The epoxy resin composition described in the above item [9] or [10], wherein the component (D2) is a triblock copolymer or a polyamide elastomer.

[12] The epoxy resin composition described in any one of the above items [9] to [11], wherein the component (B2) is a boron trichloride-amine complex.

[13] The epoxy resin composition described in any one of the above items [9] to [12], wherein the component (A2) is at least one component selected from the group consisting of an epoxy resin having an aromatic ring in the molecule and hexahydrophthalic acid diglycidyl ester.

[14] An epoxy resin composition, including an epoxy resin, an epoxy resin curing agent which is a boron trihalide-amine complex, and a thermoplastic resin, the epoxy resin composition having a characteristic of forming, when the composition is cured, a phase separation structure 1 in which a phase of a cured product of the epoxy resin composition and a phase of the thermoplastic resin constitute a sea-island phase separation structure, and further forming a phase separation structure 2 which is a sea-island phase separation structure, by taking the island structure in the phase separation structure 1 as a sea structure.

[15] The epoxy resin composition described in the above item [14], wherein the content of the epoxy resin curing agent is 8 to 20 parts by weight relative to 100 parts by mass of the epoxy resin, and the content of the thermoplastic resin is 1 to 50 parts by weight relative to 100 parts by mass of the epoxy resin.

[16] The epoxy resin composition described in the above item [14] or [15], wherein the sea structure in the phase separation structure 1 is a phase of a cured product of the epoxy resin, and the island structure is a phase of the thermoplastic resin.

[17] The epoxy resin composition described in any one of the above items [14] to [16], wherein the island structure in the phase separation structure 2 is in a spherical form formed from a cured product of the epoxy resin.

[18] The epoxy resin composition described in any one of the above items [14] to [17], wherein the major axis of the island structure in the phase separation structure 1 is 50 nm to 300 μm in length.

[19] The epoxy resin composition described in any one of the above items [14] to [18], wherein the major axis of the island structure (provided that when the sea-island structure is spherical, the diameter) in the phase separation structure 2 is 10 nm to 100 μm in length.

[20] The epoxy resin composition described in any one of the above items [14] to [19], wherein the thermoplastic resin is the following component (D3):

component (D3): at least one block copolymer selected from the group consisting of a S-B-M triblock copolymer and a M-B-M triblock copolymer, in which the respective blocks represented by S, B and M are linked by covalent bonding, the block M is a homopolymer of polymethyl methacrylate, or a copolymer containing methyl methacrylate at a proportion of at least 50% by mass in terms of monomer relative to the total mass of all the monomers, which is the feed amount of the block M, the block B is a block which is non-compatible with the block M and has a glass transition temperature of 20° C. or lower, and the block S is a block which is non-compatible with the blocks B and M and has a glass transition temperature higher than the glass transition temperature of the block B.

[21] The epoxy resin composition described in any one of the items [14] to [20], further including component (C3): rubber particles in an amount of 12 to 110 parts by mass relative to 100 parts by mass of the epoxy resin.

[22] A tow prepreg obtained by impregnating a reinforcing fiber bundle with the epoxy resin composition described in any one of the above items [1] to [21].

[23] The tow prepreg described in the above item [22], wherein the reinforcing fiber bundle is a carbon fiber bundle.

[24] The tow prepreg described in the above item [23], wherein the carbon fiber bundle is a carbon fiber bundle obtained by bundling 1000 to 70,000 filaments having a fiber diameter of 3 to 12 μm.

[25] The tow prepreg described in claim 23 or 24, wherein the strand strength according to JIS R7601 of the carbon fiber is 3500 MPa or more.

[26] A composite material-reinforced pressure vessel produced using the tow prepreg described in any one of the above items [22] to [25].

[27] A composite material-reinforced pressure vessel produced by filament winding molding using a reinforcing fiber bundle impregnated with the epoxy resin composition described in any one of the above items [1] to [21].

[28] The composite material-reinforced pressure vessel described in the above item [27], wherein the composite material-reinforced pressure vessel is a composite material-reinforced pressure vessel produced by filament winding molding by winding the reinforcing fiber bundle impregnated with the epoxy resin composition around a liner, and the liner is made of a thermoplastic resin.

[29] The composite material-reinforced pressure vessel described in the above item [27] or [28], wherein the reinforcing fiber bundle is a carbon fiber bundle.

[30] A composite material-reinforced pressure vessel, formed by coating the outer surface of a liner with a composite material layer, the composite material layer being a layer formed using the tow prepreg described in any one of the above items [22] to [25].

[31] The composite material-reinforced pressure vessel described in the above item [30], wherein the liner is made of a thermoplastic resin.

[32] A tendon formed from a composite material, the tendon formed using the tow prepreg described in any one of the above items [22] to [25].

Effect of the Invention

According to the present invention, there is provided an epoxy resin composition which has excellent storage stability and produces a cured product having excellent toughness and heat resistance. This epoxy resin composition can also be suitably used as a matrix resin in a reinforcing fiber composite material. That is, this epoxy resin composition can be used in general industrial applications such as sports goods, automobiles, pressure vessels, airplanes, and tendons. Particularly, this epoxy resin composition is characterized by exhibiting high performance when used in a pressure vessel or a tendon. Also, this epoxy resin composition is such that when used as a matrix resin in a reinforcing fiber composite material, this epoxy resin composition can also be combined with a reinforcing fiber and applied in an intermediate material such as a prepreg or a tow prepreg. Particularly, when this epoxy resin composition is applied to a tow prepreg, the tow prepreg has satisfactory reelability from a bobbin and satisfactory processability, and has excellent drape properties. The epoxy resin composition according to the present invention can be used in molding that does not involve an intermediate material, such as RTM molding (Resin Transfer Molding), filament winding molding (FW molding), and pultrusion molding, or a tow prepreg using the epoxy resin composition according to the present invention can be used in filament winding, pultrusion molding or the like.

MODE(S) FOR CARRYING OUT THE INVENTION

First Embodiment

Figure 1:
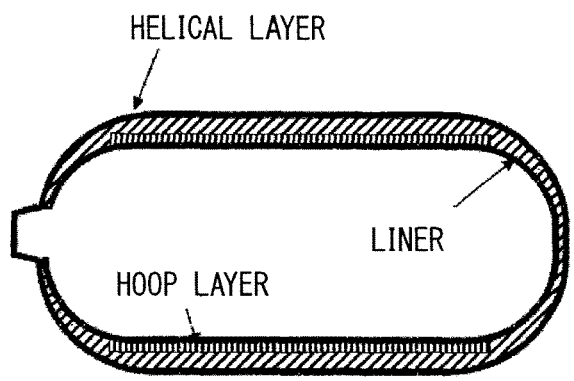
FIG. 1 is a schematic cross-sectional diagram illustrating an example of a composite material-reinforced pressure vessel produced using an epoxy resin composition according to an exemplary embodiment of the present invention.

The epoxy resin composition according to a first embodiment of the present invention is an epoxy resin composition containing component (A1): an epoxy resin, component (B1): a boron trihalide-amine complex, and component (C1): rubber particles. Hereinbelow, the various components will be explained.

<Component (A1)>

Component (A1) is an epoxy resin.

Usually, the term epoxy resin is used as a name for one category of thermosetting resins, and as a name for a category of chemical substances called compounds having plural 1,2-epoxy groups in the molecule; however, in the present invention, the term is used to mean the latter. Furthermore, the term epoxy resin composition means a composition including an epoxy resin, a curing agent, and optionally other components.

The epoxy resin is not particularly limited as long as it is an epoxy resin having two or more epoxy groups in the molecule; however, from the viewpoint of imparting heat resistance to the cured product, it is preferably at least one epoxy resin selected from the group consisting of an epoxy resin having an aromatic ring in the molecule, and an epoxy resin having an aliphatic ring in the molecule.

For the component (A1), it is preferable to use a bifunctional epoxy resin having an aromatic ring in the molecule. When a bifunctional epoxy resin having an aromatic ring in the molecule is used, the viscosity of the epoxy resin composition of the present invention can be adjusted to a range appropriate for handling. Furthermore, the mechanical characteristics of a cured product of the epoxy resin composition of the present invention can be adjusted to an appropriate range.

The "bifunctional epoxy resin" as used herein means a compound having two epoxy groups in the molecule.

Examples of the aromatic ring for the bifunctional epoxy resin having an aromatic ring in the molecule include a benzene ring, a naphthalene ring, and a fluorene ring.

Examples of the bifunctional epoxy resin having an aromatic ring in the molecule include a bisphenol A diglycidyl ether type epoxy resin, a bisphenol F diglycidyl ether type epoxy resin, a bisphenol S diglycidyl ether type epoxy resin, a resorcin diglycidyl ether type epoxy resin, a hydroquinone diglycidyl ether type epoxy resin, a terephthalic acid diglycidyl ester type epoxy resin, a bisphenoxyethanol fluorene diglycidyl ether type epoxy resin, a bisphenol fluorene diglycidyl ether type epoxy resin, and a biscresol fluorene diglycidyl ether type epoxy resin. However, the examples are not limited to these, and two or more kinds of epoxy resins may be used in combination.

Among them, regarding the bifunctional epoxy resin having an aromatic ring in the molecule, from the viewpoint that handling or impregnation into a reinforcing fiber bundle is easily achieved because the viscosity of the epoxy resin composition can be lowered, and that heat resistance of a cured product is also excellent, a liquid bisphenol A diglycidyl ether type epoxy resin having an epoxy equivalent of from 170 g/eq to 200 g/eq is particularly preferred.

Regarding the component (A1), a trifunctional or tetrafunctional epoxy resin having an aromatic ring in the molecule may also be used. When a trifunctional or tetrafunctional epoxy resin having an aromatic ring in the molecule is used as the component (A1), handling of the epoxy resin composition of the present invention and heat resistance of a cured product of the epoxy resin composition of the present invention can be adjusted to appropriate ranges.

Meanwhile, the "trifunctional or tetrafunctional epoxy resin" as used herein means a compound having three or four epoxy groups in the molecule. Examples of the aromatic ring for the trifunctional or tetrafunctional epoxy resin having an aromatic ring in the molecule include the same rings as the aromatic rings that may be carried by the "bifunctional epoxy resin".

Specific examples of a trifunctional epoxy resin having an aromatic ring in the molecule include a novolac type epoxy resin, an N,N,O-triglycidyl-p- or -m-aminophenol type epoxy resin, an N,N,O-triglycidyl-4-amino-m- or -5-amino-o-cresol type epoxy resin, and a 1,1,1-(triglycidyloxyphenyl)methane type epoxy resin.

Examples of a tetrafunctional epoxy resin having an aromatic ring in the molecule include a glycidylamine type epoxy resin. Specific examples include epoxy resins of diaminodiphenylmethane type, diaminodiphenylsulfone type, and meta-xylenediamine type.

Among them, from the viewpoint that impregnation into a reinforcing fiber bundle or handling is easily achieved because the viscosity of an epoxy resin composition can be made relatively lower, and that heat resistance of a cured product is also excellent, an N,N,N',N'-tetraglycidylaminodiphenylmethane (TGDDM) type epoxy resin having an epoxy equivalent of from 110 g/eq to 130 g/eq is particularly preferably used.

The trifunctional epoxy resin and tetrafunctional epoxy resin having an aromatic ring in the molecule are not intended to be limited to these. Furthermore, two or more kinds of epoxy resins having an aromatic ring in the molecule may also be used in combination.

Meanwhile, when a bifunctional epoxy resin and a trifunctional or tetrafunctional epoxy resin are used in combination as the epoxy resin having an aromatic ring in the molecule, the ratio of these resins is such that at least one epoxy resin selected from the group consisting of trifunctional and tetrafunctional epoxy resins:bifunctional epoxy resin as a mass ratio is preferably 10:90 to 40:60, and more preferably 15:85 to 60:40.

If the content of the bifunctional epoxy resin is markedly large, there may be a problem that it is difficult to impart relatively high heat resistance that would result in a cured product having a glass transition temperature of 150° C. or higher. On the contrary, if the content of the bifunctional epoxy resin is markedly small, the cured product may become noticeably brittle, the epoxy resin composition may have relatively high viscosity, and there is a possibility of having a problem that handling or impregnation into a reinforcing fiber bundle may become difficult. Furthermore, if the content of the trifunctional or tetrafunctional epoxy resin is markedly large, the epoxy resin composition has relatively high viscosity, and there may be a problem that handling or impregnation into a reinforcing fiber bundle becomes difficult. On the contrary, if the content of the trifunctional or tetrafunctional epoxy resin is markedly small, there may be a problem that it is difficult to impart relatively high heat resistance that would result in a cured product having a glass transition temperature of 150° C. or higher.

Regarding the component (A1), a bifunctional to tetrafunctional epoxy resin having an aliphatic ring in the molecule may be used. Examples of the epoxy resin include a compound in which an aliphatic ring is condensed with an epoxy ring, and a compound in which a substituent containing an epoxy group such as a glycidyl is bonded to an aliphatic ring. The aliphatic ring for a compound in which an aliphatic ring is condensed with an epoxy ring, is preferably an aliphatic ring having 6 carbon atoms, and specific examples thereof include a cyclohexane ring.

Examples of the compound in which an aliphatic ring is condensed with an epoxy ring include 3,4-epoxycyclohexylmethyl carboxylate.

When these are used as the component (A1), it is preferable because the viscosity of the epoxy resin composition can be lowered, and because handling or impregnation into a reinforcing fiber bundle is made easier, while the cured product has excellent heat resistance. Furthermore, it is preferable because in a case in which a fiber reinforcing composite material is produced, an effect of enabling appropriate adjustment of the force of adhesion between the matrix resin and the surface of the reinforcing fiber is obtained. Also, the aliphatic ring for the compound in which a substituent containing an epoxy group such as a glycidyl group is bonded to an aliphatic ring, is preferably an aliphatic ring having six carbon atoms, and specific examples thereof include a cyclohexane ring.

Examples of the compound in which a substituent containing an epoxy group such as glycidyl group is bonded to an aliphatic ring include hexahydrophthalic acid diglycidyl ester, and methyltetrahydrophthalic acid diglycidyl ester. When these are used as the component (A1), it is preferable because the viscosity of the epoxy resin composition can be lowered, and because handling or impregnation into a reinforcing fiber bundle is made easier, and in a case in which a fiber-reinforced composite material is produced, the force of adhesion between the matrix resin and the surface of the reinforcing fiber can be appropriately adjusted. Furthermore, the epoxy resin having an aliphatic ring in the molecule may be used in combination of two or more kinds thereof.

Also, an epoxy resin having an aromatic ring in the molecule and an epoxy resin having an aliphatic ring in the molecule may be used in combination as the component (A1).

As such, various epoxy resins can be used as the component (A1) of the present invention; however, from the viewpoint of imparting heat resistance to the cured product, an epoxy resin having an aromatic ring in the molecule is preferred. Particularly, in 100 parts by mass of the component (A1), the content of the epoxy resin having an aromatic ring in the molecule is preferably 30 to 100 parts by mass, more preferably 40 to 100 parts by mass, even more preferably 50 to 100 parts by mass, and most preferably 60 to 100 parts by mass.

Specifically, the epoxy resin having an aromatic ring in the molecule is preferably a liquid bisphenol A diglycidyl ether type epoxy resin having an epoxy equivalent of from 170 g/eq to 200 g/eq is preferred, and it is preferable to use these at a content of 30 to 100 parts by mass in 100 parts by mass of the component (A1).

Meanwhile, the component (A1) may include an epoxy resin other than those described above, to the extent that the effect of the present invention is not impaired.

<Component (B1)>

Component (B1) is a boron trihalide-amine complex.

The boron trihalide-amine complex is preferably a complex composed of boron halide such as boron trihalide or boron trifluoride, and an organic amine. That is, the component (B1) is preferably a boron trichloride-amine complex or a boron trifluoride-amine complex.

Specific examples include a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-diethylamine complex, a boron trifluoride-dibutylamine complex, a boron trifluoride-piperidine complex, a boron trifluoride-dibenzylamine complex, compounds in which fluorine atoms in these compounds are replaced with chlorine atoms, and a boron trichloride-dimethyloctylamine complex.

Among these complexes, a boron trifluoride-piperidine complex and a boron trichloride-dimethyloctylamine complex, which have excellent solubility in an epoxy resin, enable composition containing these complexes to have excellent pot life properties, and are industrially easily available, can be preferably used.

Fiber-reinforced composite materials produced by using these complexes as curing agents can obtain a force adequate for exhibiting excellent tensile strength, in connection with the force of adhesion between the matrix resin and the surface of the reinforcing fiber. Furthermore, when a component (C1) is used in combination, due to an enhancement of toughness of the matrix resin, fiber-reinforced composite materials produced by using these complexes as curing agents can obtain an excellent tensile strength manifesting effect. Moreover, when a complex having excellent solubility in an epoxy resin, such as a boron trifluoride-piperidine complex or a boron trichloride-dimethyloctylamine complex, is used, generation of voids in the fiber-reinforced composite material thus produced can be suppressed. Thereby, the fiber-reinforced composite material can obtain an excellent tensile strength manifesting effect.

When at least one selected from the group consisting of an epoxy resin having an aromatic ring in the molecule, and a compound in which a substituent containing an epoxy group such as a glycidyl group is bonded to an aliphatic ring (particularly, hexahydrophthalic acid diglycidyl ester) is used, it is preferable to use a boron trichloride-amine complex as the component (B1) since curing can be achieved in a short time at a lower temperature.

On the other hand, when a compound in which an aliphatic ring is condensed with an epoxy ring is used as the component (A1), since curing can be achieved in a short time at a lower temperature, it is preferable to use a boron trifluoride-amine complex as the component (B1).

A preferred amount of incorporation of the component (B1) is usually 8 parts by mass or more, preferably 9 parts by mass or more, and usually 20 parts by mass or less, preferably 18 parts by mass or less, and more preferably 17 parts by mass or less, relative to 100 parts by mass of the component (A1) included in the epoxy resin composition of the present invention.

That is, a preferred amount of incorporation of the component (B1) is preferably from 8 parts by mass to 20 parts by mass, more preferably from 8 parts by mass to 18 parts by mass, even more preferably from 9 parts by mass to 18 parts by mass, and particularly preferably from 9 parts by mass to 17 parts by mass, relative to 100 parts by mass of the component (A1). When the amount of incorporation of the component (B1) is significantly large or significantly small, there is a possibility that heat resistance of the cured resin may be decreased.

<Component (C1)>

Component (C1) is rubber particles, and is incorporated for an enhancement of toughness of the epoxy resin composition after being cured. For the component (C1), at least one kind of rubber particles selected from the group consisting of crosslinked rubber particles, and core-shell type rubber particles in which, on the surface of crosslinked rubber particles, a polymer different from the polymer that constitutes the crosslinked rubber particles is graft-polymerized, is preferably used.

In regard to the crosslinked rubber particles, the kind of rubber is not limited, and for example, butadiene rubber, acrylic rubber, silicone rubber, butyl rubber, NBR, SBR, IR, and EPR are used.

Examples of crosslinked rubber particles include product name: YR-500 Series (manufactured by Toto Chemical Corp.).

The "core-shell type rubber particles" are rubber particles in which, on the surface of a particulate core component containing a crosslinked rubber-like polymer as a main component, a shell component polymer of a different kind from the core component is graft-polymerized, and thereby a part or the entirety of the surface of the particulate core component is coated with the shell component.

Examples of the core component that constitutes the core-shell type rubber particles include the same components as those of the crosslinked rubber particles described above. Among them, a crosslinked rubber-like polymer composed of styrene and butadiene has a high toughness enhancing effect and is preferable.

It is preferable that the shell component that constitutes the core-shell type rubber particles is graft-polymerized to the core component described above and is chemically bonded to the polymer that constitutes the core component. The "chemical bonding" as used herein means a bonding between atoms that form a molecule or a crystal by binding atoms or ions. Particularly, chemical bonding as used herein means covalent bonding formed as a pair of electrons is shared by two atoms.

Regarding the component that constitutes such a shell component, for example, a polymer obtained by polymerizing at least one selected from the group consisting of an acrylic acid ester-based monomer, a methacrylic acid ester-based monomer and an aromatic-based vinyl monomer, can be used. When a crosslinked rubber-like polymer composed of styrene and butadiene is used as the core component, a mixture of methyl methacrylate, which is a (meth)acrylic acid ester, and styrene, which is an aromatic vinyl compound, can be suitably used as the shell component.

Furthermore, it is preferable for the shell component to have introduced therein a functional group that reacts with the component (A1) constituting the epoxy resin composition of the present invention, in order to stabilize the dispersion state. Examples of such a functional group include a hydroxyl group, a carboxyl group, and an epoxy group, and among them, an epoxy group is preferred. Regarding the method for introducing an epoxy group, there is available a method of using, for example, 2,3-epoxypropyl methacrylate in combination with the shell component described above, and thereby performing graft polymerization to the core component.

Specific examples of commercially available products include product name: W-5500 and product name: J-5800 (manufactured by Mitsubishi Rayon Co., Ltd.), which use acrylic rubber; product name: SRK-200E (manufactured by Mitsubishi Rayon Co., Ltd.), which uses silicone-acrylic composite rubber; product name: PARALOID EXL-2655 (manufactured by Kureha Corp.), which is formed from a butadiene-alkyl methacrylate-styrene copolymer; product name: STAPHYLOID AC-3355 and product name: TR-2122 (manufactured by Takeda Pharmaceutical Co., Ltd.), which are formed from acrylic acid ester-methacrylic acid ester copolymers; and product name: PARALOID EXL-2611 and product name: EXL-3387 (Manufactured by Rohm & Haas Co.), which are formed from butyl acrylate-methyl methacrylate copolymers.

The rubber particles may be dispersed in the component (A1) using a stirring machine, a roll mill or the like during the preparation of the epoxy resin composition. However, when a master batch type rubber particle-dispersed epoxy resin in which rubber particles are dispersed in advance in an epoxy resin is used, the preparation time for the epoxy resin composition can be shortened, and also, the dispersion state of the rubber particles in the epoxy resin composition can be made satisfactory, which is preferable. Furthermore, it is particularly preferable that the rubber particles and the epoxy resin component are chemically bonded or physically bonded.

Examples of such a master batch type crosslinked rubber particle-dispersed epoxy resin include product name: BPF307 and product name: BPA328 (manufactured by Nippon Shokubai Co., Ltd.), which contain acrylic rubber; product name: MX-113 and product name: MX-416, which contain core-shell rubber particles formed from a core component of a copolymer of styrene and butadiene, and a shell component containing methyl methacrylate and having a functional group that reacts with an epoxy resin; product name: MX-156, which contains butadiene rubber; and product name: MX-960 (manufactured by Kaneka Corp.), which contains silicone rubber.

Meanwhile, for an enhancement of toughness of the epoxy resin composition after being cured, and particularly for an effect of increasing the burst pressure in the case of using a pressure vessel that will be described below, the component (C1) is preferably rubber particles containing butadiene rubber. That is, butadiene rubber particles, or core-shell type rubber particles containing butadiene rubber particles as a core component are preferred, and core-shell type rubber particles containing butadiene rubber particles as a core component are particularly preferred.

Furthermore, the particle size of the component (C1) in a cured product of the epoxy resin composition of the present invention is preferably from 50 nm to 400 nm, and more preferably from 50 nm to 300 nm. The particle size of the component (C1) in the cured product can be measured by the following method.

<When Particle Size of Component (C1) can be Identified by Scanning Electron Microscopy (SEM)>

An arbitrary area of 100 μm² of the broken surface of a test sample generated when the fracture toughness value of a cured resin is measured according to ASTM D5045, is observed using SEM, and the particle size of the component (C1) identified, or the diameter of a recess from which the component (C1) has fallen off, is measured at any arbitrary 10 sites. The average value is designated as the particle size of the component (C1).

<When it is Difficult to Identify Particle Size of Component (C1) by SEM>

A cured resin plate is immersed in dichloromethane, and the component (C1) is eluted. An arbitrary area of 100 μm2 of the cured resin plate from which the component (C1) has been eluted is observed by scanning probe microscopy, the diameter of an identified recess from which the component (C1) has been eluted is measured at any arbitrary 10 sites, and the average value is designated as the particle size of the component (C1).

In order to adjust the particle size in a cured product to the range described above, the particle size of the component (C1) in a cured product of the epoxy resin composition can be controlled to the range described above by using component (C1): rubber particles having a volume average particle size of primary particles of preferably from ○○ nm to 400 nm, and more preferably from ○○ nm to 300 nm, dispersing the component (C1) in the component (A1) using a stirring machine, a roll mill or the like; or by preparing an epoxy resin composition using a master batch type rubber particle-dispersed epoxy resin in which the component (C1) is dispersed in advance in the component (A1). Meanwhile, the volume average particle size of primary particles of the rubber particles can be measured with a laser diffraction/scattering type particle size analyzer or the like.

A preferred amount of incorporation of the component (C1) is usually 12 parts by mass or more, preferably 16 parts by mass or more, and more preferably 20 parts by mass or more, and usually 110 parts by mass or less, preferably 100 parts by mass or less, and more preferably 80 parts by mass or less, relative to 100 parts by mass of the component (A1) contained in the epoxy resin composition of the present invention.

That is, a preferred amount of incorporation of the component (C1) is usually preferably from 12 parts by mass to 110 parts by mass, more preferably from 16 parts by mass to 100 parts by mass, and particularly preferably from 20 parts by mass to 80 parts by mass, relative to 100 parts by mass of the component (A1).

When the component (C1) is included in a markedly large amount, dispersion thereof into an epoxy resin may be difficult, or the epoxy resin composition becomes highly viscous, so that there may be a problem that handling or impregnation into a reinforcing fiber bundle becomes difficult. On the contrary, when the component (C1) is included in a markedly small amount, the enhancement of toughness of the epoxy resin composition after being cured is insufficient, and there is a possibility of having a problem that the effect of the present invention may not be obtained.

<Component (D1)>

The epoxy resin composition of the present invention may further include component (D1): a polymer which is compatible with the epoxy resin composition containing the components (A1) to (C1), and has a characteristic of forming a phase separation structure when an epoxy resin composition including component (D1) is cured. Toughness of a cured product of the epoxy resin composition is increased by the rubber particles of the component (C1), but toughness can be further increased by adding the component (D1).

Examples of the component (D1) include triblock copolymers such as a M-B-M triblock copolymer and a S-B-M triblock copolymer (provided that block M is a homopolymer of polymethyl methacrylate, or a copolymer containing methyl methacrylate at a proportion of at least 50% by mass in terms of monomer relative to the total mass of all the monomers, which is the feed amount of the block M; block B is a polymer obtained by polymerizing one or more monomers selected from butadiene, isoprene, 2,3-dimethyl-1,3-butadiene, 1,3-pentadiene, 2-phenyl-1,3-butadiene and (meth)acrylic acid esters as monomers; and block S is a polymer obtained by polymerizing one or more monomers selected from styrene, α-methylstyrene and vinyltoluene); and polyamide elastomers.

A specific example of the triblock copolymer M-B-M may be a copolymer composed of methyl methacrylate-butyl acrylate-methyl methacrylate, and specific examples thereof include NANOSTRENGTH M22 (manufactured by Arkema S.A.) and NANOSTRENGTH M22N (manufactured by Arkema S.A.) having polar functional groups.

A specific example of the triblock copolymer S-B-M may be a copolymer composed of styrene-butadiene-methyl methacrylate, and specific examples thereof include NANOSTRENGTH 123, NANOSTRENGTH 250, NANOSTRENGTH 012, NANOSTRENGTH E20, and NANOSTRENGTH E40 (all manufactured by Arkema S.A.).

Examples of the polyamide elastomers include a polyether ester amide block copolymer and a polyester amide block copolymer, and specific examples thereof include TPAE series (TPAE12, TPAE31, TPAE32, TPAE38, TPAE8, TPAE10, TPAE100, TPAE23, TPAE63, TPAE200, TPAE201, and TPAE260) (all manufactured by T&K Toka Corp.).

For the component (D1), various polymers may be used singly, or two or more kinds of polymers may be used in combination.

A preferred amount of incorporation of the component (D1) is usually 1 to 50 parts by mass, and more preferably 5 to 25 parts by weight, relative to 100 parts by mass of the component (A1) included in the epoxy resin composition of the present invention. If the component (D1) is present in an excessively large amount, the epoxy resin composition becomes highly viscous, and there may be a problem that handling or impregnation into a reinforcing fiber bundle may become difficult. On the other hand, if the component (D1) is present in an excessively small amount, there is a possibility that the effect of incorporating the component (D1) may not be sufficiently obtained.

<Additives>

Furthermore, in the epoxy resin composition of the present invention, additives such as inorganic particles such as silica powder, AEROSIL, microballoons, antimony trioxide, alumina, and titanium oxide; flame retardants such as phosphorus compounds; carbon particles such as carbon black and activated carbon; defoamants; and wetting agents, may be incorporated according to the purpose, to the extent that the effect of the present invention is not impaired. The content of these additives may be in an extent that the effect of the present invention is not impaired, and the content is preferably from 0.1 parts by weight to 20 parts by weight relative to 100 parts by weight of the epoxy resin composition according to the first embodiment of the present invention.

<Epoxy Resin Composition>

The epoxy resin composition according to the first embodiment of the present invention includes the following components (A1) to (C1) as essential components:

component (A1): an epoxy resin;
component (B1): a boron trihalide-amine complex; and
component (C1): rubber particles.

Furthermore, the epoxy resin composition according to the first embodiment of the present invention may also include, in addition to the components (A1) to (C1), component (D1): a polymer which is compatible with an epoxy resin composition containing the components (A1) to (C1), and has a characteristic of forming a phase separation structure when the epoxy resin composition containing the component (D1) is cured, and various additives as described above.

Such an epoxy resin composition may be prepared according to a known method, and may be prepared according to, for example, the methods described in JP 2012-25892, WO 2011/037239, and the like.

The viscosity at 30° C. of the epoxy resin composition according to the first embodiment of the present invention is preferably 300 Pa·s or less, and more preferably 150 Pa·s or less. If the viscosity exceeds 300 Pa·s, since the epoxy resin composition becomes highly viscous, handling or impregnation into a reinforcing fiber bundle may become difficult, and when a tow prepreg is produced therefrom, there may be problems in reelability from a bobbin, processability, and drape properties.

Furthermore, the lower limit of the viscosity is usually about 0.1 Pa·s, from the reasons that when a tow prepreg passes through a process or at the time of FW molding, there may be a problem that the epoxy resin composition supplied to the reinforcing fiber bundle may fall off, or when a tow prepreg or a reinforcing fiber bundle supplied with a resin is wound around a mandrel or a liner by FW molding, there may be a problem that the epoxy resin composition droops and falls down to the liner or a composite material-reinforced pressure vessel.

That is, the viscosity at 30° C. of the epoxy resin composition according to the first embodiment of the present invention is preferably from 0.1 Pa·s to 300 Pa·s, and more preferably from 0.1 Pa·s to 150 Pa·s.

Meanwhile, regarding the range of the viscosity at 30° C. of the epoxy resin composition according to the first embodiment of the present invention, it is desirable if the viscosity when the object of measurement is brought to 30° C. is in the range described above, and even for an epoxy resin composition exhibiting a viscosity out of the above-described range under measurement conditions other than 30° C., if the epoxy resin has a viscosity at 30° C. in the above-described range, the epoxy resin composition is included in the scope of the present invention.

In order to adjust the viscosity of the composition to the range described above, it is preferable to incorporate the components (A1) to (C1) respectively at the proportions described above.

The viscosity of the epoxy resin composition can be measured by the following method.

<Method for Measuring Viscosity of Epoxy Resin Composition>

The viscosity of the resin composition upon temperature increase is measured under the following measurement conditions, and the viscosity at 30° C. is determined.

Measurement Conditions

Apparatus: AR-G2 (manufactured by TA Instruments, Inc.)
Plate used: 35 mmφ parallel plate
Plate gap: 0.5 mm
Measurement frequency: 10 rad/sec
Rate of temperature increase: 2° C./min
Stress: 3000 dynes/cm$^2$ Second Embodiment The epoxy resin composition according to a second embodiment of the present invention is an epoxy resin composition including components (A2), (B2) and (D2) described below, the epoxy resin composition including 12 to 110 parts by mass of the component (B2) and 1 to 50 parts by mass of the component (D2) relative to 100 parts by mass of the component (A2):

component (A2): an epoxy resin;
component (B2): a boron trihalide-amine complex; and
component (D2): a polymer which is compatible with an epoxy resin composition containing the components (A2) and (B2), and is capable of forming a phase separation structure after being cured.

Hereinafter, the various components will be explained.

The component (A2) according to the second embodiment of the present invention is an epoxy resin, and the same epoxy resins as those listed as the component (A1) according to the first embodiment may be used.

The component (A2) is preferably at least one component selected from the group consisting of an epoxy resin having an aromatic ring in the molecule, and hexahydrophthalic acid diglycidyl ester.

The component (B2) according to the second embodiment of the present invention is a boron trihalide-amine complex, and the same boron trihalide-amine complexes as those listed as the component (B1) according to the first embodiment may be used.

Examples of the component (B2) include a boron trichloride-amine complex and a boron trifluoride-amine complex, and a boron trichloride-amine complex is preferred.

The component (D2) according to the second embodiment of the present invention is a polymer which is compatible with an epoxy resin composition containing the components (A2) and (B2), and has a characteristic of forming a phase separation structure in a cured product obtainable when an epoxy resin containing the component (D2) is cured.

Examples of the component (D2) include the same polymers as those listed as the component (D1) according to the first embodiment.

The component (D2) is preferably at least one component selected from the group consisting of triblock copolymers and polyamide elastomers.

A preferred amount of incorporation of the component (B2) is preferably from 8 parts by mass to 20 parts by mass, more preferably from 8 parts by mass to 18 parts by mass, even more preferably from 9 parts by mass to 18 parts by mass, and particularly preferably from 9 parts by mass to 17 parts by mass, relative to 100 parts by mass of the component (A2).

A preferred amount of incorporation of the component (D2) is preferably 1 to 50 parts by mass, and more preferably 5 to 25 parts by weight, relative to 100 parts by mass of the component (A2).

The epoxy resin composition according to the second embodiment of the present invention may further include additives, to the extent that the effect of the present invention is not impaired. Regarding the additives, the same additives as those listed as the additives according to the first embodiment may be used.

The content of the additives is preferably 20 parts by weight or less relative to 100 parts by weight of the epoxy resin composition according to the second embodiment of the present invention.

The viscosity at 30° C. of the epoxy resin composition according to the second embodiment of the present invention is preferably from 0.1 Pa·s to 300 Pa·s, and more preferably from 0.1 Pa·s to 150 Pa·s.

Third Embodiment

The epoxy resin composition according to the third embodiment of the present invention is an epoxy resin composition including an epoxy resin, an epoxy resin curing agent, and a thermoplastic resin, and the epoxy resin composition is an epoxy resin composition having a characteristic by which, when the composition is cured, a phase of a cured product of the epoxy resin and a phase of the thermoplastic resin form a sea-island phase separation structure (that is, phase separation structure 1), and a sea-island phase separation structure (phase separation structure 2) is further formed by taking the island structure in the phase separation structure 1 as a sea structure.

Meanwhile, the "sea-island phase separation structure" according to the present specification and the claims is a kind of phase separation structure. For example, when two kinds of resins are mixed and cured, if there is a deviation in the mixing ratio, a structure in which the component in a larger amount constitutes a continuous phase, and the component in a smaller amount constitutes an isolated phase, is achieved. At this time, the continuous phase is referred to as "sea structure", and the isolated phase is referred to as "island structure".

In regard to the epoxy resin composition according to the third embodiment of the present invention, when the epoxy resin composition is cured, the cured product may have high toughness and heat resistance by forming a special phase separation structure as such. Therefore, the epoxy resin composition according to the third embodiment of the present invention can be suitably used as a matrix resin for a reinforcing fiber composite material, similarly to the epoxy resin compositions according to the first and second embodiments described above.

In regard to the phase separation structure 1, it is preferable that the sea structure is a phase of a cured product of the epoxy resin, and the island structure is a phase of the thermoplastic resin. Furthermore, in regard to the phase separation structure 2, the island structure is preferably a phase of a cured product of the epoxy resin, and is particularly preferably in a spherical form.

It is speculated that when the sea structure and the island structure are respectively formed by these phases, the cured product may have high toughness and heat resistance. Meanwhile, the "phase of a cured product of the epoxy resin" may contain components other than the components derived from the epoxy resin and the epoxy resin curing agent to the extent that the phase is not destroyed, and the "phase of the thermoplastic resin" may also similarly contain components other than the thermoplastic resin to the extent that the phase is not destroyed.

The length of the major axis of the island structure in the phase separation structure 1 is not particularly limited, but the length is preferably 50 nm to 300 µm, more preferably 50 nm to 200 µm, and even more preferably 50 nm to 100 µm.

When the length of the major axis is in this range, there is an advantage that cracks in the cured product of the epoxy resin composition can easily propagate to the island phase, the crack propagation distance is elongated, and the toughness value of the cured product is increased. Furthermore, the length of the major axis of the island structure (provided that in the case where the island structure is in a spherical form, the diameter) in the phase separation structure 2 is not particularly limited as long as the length of the major axis is not larger than the size of the island structure of the phase separation structure 1 (that is, the sea structure of the phase separation structure 2). However, the length is preferably 10 nm to 100 µm, more preferably 10 nm to 50 µm, and even more preferably 10 nm to 30 µm.

When the length of the major axis is in this range, there is an advantage that cracks in a cured product of the epoxy resin composition can easily propagate to the island phase, the crack propagation distance is elongated more in the small island than in the larger island phase, and the toughness value of the cured product is increased.

There are no particular limitations on the curing conditions for the resin composition for forming such a particular sea-island structure; however, for example, when the rate of temperature increase is adjusted to 1° C./min or less, and the curing temperature is adjusted to about 110° C. to 135° C., the curing rate of the composition becomes appropriate, and a desired phase separation structure can be easily obtained.

Meanwhile, the "length of the major axis" as used herein means the length of the longest part of the island structure.

Figure 4:
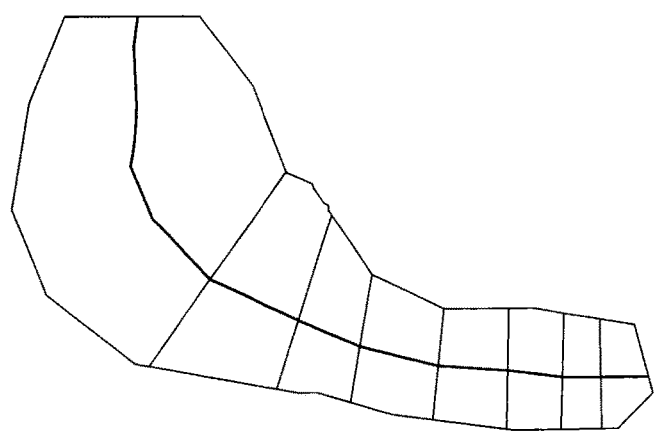
FIG. 4 is a diagram explaining the method for measuring the length of the major axis of an island structure according to a third embodiment of the present invention.

In order to measure the length of the major axis, as described in the Examples of the present application, first, a cured plate was produced using an epoxy resin composition, a cross-section thereof was observed with a laser scan microscope, the shortest distances at various short edges of the island structure were connected, and the length of connecting their centers with a line was designated as the major axis. A measurement example of the length of the major axis of an island structure is illustrated in FIG. 4.

It is preferable for the epoxy resin composition according to the third embodiment of the present invention to contain 8 to 20 parts by weight of the epoxy resin curing agent and 1 to 50 parts by weight of the thermoplastic resin relative to 100 parts by mass of the epoxy resin.

Particularly, it is preferable that the various components included in the composition are substances in the kinds and amounts described below.

Hereinafter, the various components will be explained in sequence.

Regarding the epoxy resin (hereinafter, may be referred to as component (A3)) that is included in the epoxy resin composition according to the third embodiment of the present invention, the same epoxy resins as those listed as the component (A1) according to the first embodiment may be used. For the component (A3), at least one component selected from an epoxy resin having an aromatic ring in the molecule and hexahydrophthalic acid diglycidyl ester is preferred.

Regarding the epoxy resin curing agent (hereinafter, may be referred to as component (B3)) that is included in the epoxy resin composition according to the third embodiment of the present invention, the same boron trihalide-amine complexes as those listed as the component (B1) according to the first embodiment may be used. Examples of the component (B3) include a boron trichloride-amine complex and a boron trifluoride-amine complex, and a boron trichloride-amine complex is preferred.

A preferred amount of incorporation of the component (B3) is preferably from 8 parts by mass to 20 parts by mass, more preferably from 8 parts by mass to 18 parts by mass, even more preferably from 9 parts by mass to 18 parts by mass, and particularly preferably from 9 parts by mass to 17 parts by mass, relative to 100 parts by mass of the component (A3).

The thermoplastic resin that is included in the epoxy resin composition according to the third embodiment of the present invention, may be component (D3): a polymer which is compatible with an epoxy resin composition containing the components (A3) and (B3), and has a characteristic of forming, when an epoxy resin containing the component (D3) is cured, a phase separation structure in the cured product.

Specifically, the component (D3) is preferably at last one block copolymer selected from the group consisting a S-B-M triblock copolymer and a M-B-M triblock copolymer.

Here, the various blocks represented by S, B and M are linked by covalent bonding.

The block M is a homopolymer of polymethyl methacrylate, or a copolymer containing methyl methacrylate at a proportion of at least 50% by mass in terms of monomer relative to the total mass of all the monomers, which is the feed amount of the block M.

The block B is a block which is non-compatible with the block M and has a glass transition temperature of 20° C. or lower. The block M is a polymer obtained by polymerizing at least one monomer selected from butadiene, isoprene, 2,3-dimethyl-1,3-butadiene, 1,3-pentadiene, 2-phenyl-1,3-butadiene, and (meth)acrylic acid esters.

The block S is a block which is non-compatible with the blocks B and M and has a glass transition temperature higher than the glass transition temperature of the block B. The block S is a polymer obtained by polymerizing at least one monomer selected from styrene, α-methylstyrene and vinyltoluene.

A specific example of the triblock copolymer M-B-M may be a copolymer composed of methyl methacrylate-butyl acrylate-methyl methacrylate, and specific examples thereof include NANOSTRENGTH M22 (manufactured by Arkema S.A.) and NANOSTRENGTH M22N (manufactured by Arkema S.A.) having polar functional groups.

A specific example of the triblock copolymer S-B-M may be a copolymer composed of styrene-butadiene-methyl methacrylate, and specific examples thereof include NANOSTRENGTH 123, NANOSTRENGTH 250, NANOSTRENGTH 012, NANOSTRENGTH E20, and NANOSTRENGTH E40 (all manufactured by Arkema S.A.).

Regarding the component (D3), various polymers may be used singly, or two or more kinds of polymers may be used in combination.

A preferred amount of incorporation of the component (D3) is usually 1 to 50 parts by mass, and more preferably 5 to 25 parts by weight, relative to 100 parts by mass of the component (A3) included in the third epoxy resin composition of the present invention.

The epoxy resin composition according to the third embodiment of the present invention may further include component (C3): rubber particles.

Regarding the component (C3), the same rubber particles as those listed as the component (C1) according to the first embodiment may be used.

A preferred amount of incorporation of the component (C3) is preferably from 12 parts by mass to 110 parts by mass, more preferably from 16 parts by mass to 100 parts by mass, and particularly preferably from 20 parts by mass to 80 parts by mass, relative to 100 parts by mass of the component (A3).

The epoxy resin composition according to the third embodiment of the present invention may further include additives to the extent that the effect of the present invention is not impaired. Regarding the additives, the same additives as the additives listed in the first embodiment may be used.

The content of the additives is preferably 20 parts by weight or less relative to 100 parts by weight of the epoxy resin composition according to the third embodiment of the present invention.

<Tow Prepreg>

A tow prepreg is an intermediate base material having a fine width that is obtainable by impregnating a reinforcing fiber bundle in which several thousand to several ten thousand strands of filaments are unidirectionally arranged, with a resin composition. The tow prepreg of the present invention is obtained by impregnating a reinforcing fiber bundle with the epoxy resin composition of the present invention described above. There are no particular limitations on the fiber diameter and number of strands of the filament that constitutes this reinforcing fiber bundle, but the fiber diameter is preferably 3 to 100 μm, and the number of strands is preferably 1,000 to 70,000. Also, the "fiber diameter"

according to the present invention is an equivalent diameter of a circle having an area equal to that of a cross-section of each fiber.

If the fiber diameter is less than 3 μm, for example, when the filaments make transverse movements on the surface of a roll, a bobbin or the like during various processing processes, the filaments may be broken, or fluff may be generated. If the fiber diameter is more than 100 μm, the filaments are hardened, and bendability tends to decrease.

Regarding the reinforcing fiber bundle according to the present invention, strengthening fibers that are used in conventional fiber-reinforced composite materials, such as glass fiber, carbon fiber, aramid fiber, graphite fiber and boron fiber, can be used. Among others, preferred is a carbon fiber or graphite fiber having a strand strength according to JIS R7601 of 3500 MPa or more; more preferred is a carbon fiber or graphite fiber having a strand strength of 4500 MPa or more; and even more preferred is a carbon fiber having a strand strength of 5000 MPa or more. Higher strand strength is more preferable.

Meanwhile, when the reinforcing fiber bundle is a carbon fiber bundle, the fiber diameter of the filament is preferably 3 to 12 μm, and the number of strands is preferably 1,000 to 70,000.

If the fiber diameter is less than 3 μm, for example, when the filaments make transverse movements on the surface of a roll, a bobbin or the like during various processing processes, the filaments may be broken, or fluff may be generated. The upper limit is usually about 12 μm from the viewpoint of the difficulties in the production of carbon fiber.

<Content of Epoxy Resin Composition>

The content of the epoxy resin composition that is included in the tow prepreg is preferably from 20% by weight to 40% by weight. When the content is 20% by weight or more, the epoxy resin composition can be sufficiently made to easily spread through the reinforcing fiber bundle. When the content is 40% by weight or less, since the fiber content by volume in the reinforcing fiber composite material is high, mechanical characteristics can be manifested effectively. In order to manifest the performance of mechanical characteristics more effectively, the content is more preferably from 20% by weight to 30% by weight.

<Method for Curing Epoxy Resin Composition>

The epoxy resin composition of the present invention can be cured by a known means. Among others, it is preferable to use a heating means which is capable of uniformly heating the surroundings of the epoxy resin composition, such as an air heating furnace. Preferred curing temperature and curing time may vary depending on the kinds of the component (A) and component (B); however, the epoxy resin composition can be usually cured by heating at about 110° C. to 135° C. for about 2 hours.

The tow prepreg of the present invention can be produced by any known production method. Among others, it is preferable to produce the tow prepreg by the following procedure.

<Preferred Method for Producing Tow Prepreg>

(1) Before an epoxy resin composition is supplied to at least one surface of a reinforcing fiber bundle, a tow is heated and spread out in advance.

(2) An epoxy resin composition is supplied to at least one surface of the reinforcing fiber bundle.

(3) The supplied epoxy resin composition is uniformly impregnated into the reinforcing fiber bundle.

(4) The temperature of the tow prepreg is cooled to about room temperature.

(5) The tow prepreg is wound around a paper tube or the like.

It is desirable that the reinforcing fiber bundle is spread out to have a flat shape, since the contact area with the epoxy resin composition is enlarged. Examples of the method for spreading out include a method of scraping with a cylindrical bar, a method of applying vibration, and a method of squashing. Furthermore, when the reinforcing fiber bundle is spread out, the reinforcing fiber bundle is heated first in order to soften the sizing agent applied on the reinforcing fiber bundle and to make it easier for the bundle to spread out. It is preferable to heat the reinforcing fiber bundle up to about the softening point of the sizing agent applied thereon. Moreover, preheating of the tow is also meaningful for raising the temperature of the reinforcing fiber bundle in advance so that the resin temperature does not decrease at the time of the penetration of the resin into the reinforcing fiber bundle. When the temperature of the reinforcing fiber bundle is increased by heating to a temperature higher than or equal to the resin temperature before contact, there is no chance that the temperature of the reinforcing fiber bundle after the contact between the reinforcing fiber bundle and the resin becomes lower than the resin temperature before contact. Regarding the heating method, heating by contacting with a heating element; and non-contact heating methods such as electric heating, dielectric heating, infrared heating, and atmosphere heating, can all be used.

According to the present invention, spreading of the reinforcing fiber bundle may be carried out in-line, or may be carried out off-line. For example, a commercially available tape-shaped reinforcing fiber bundle that has been spread out is regarded as a reinforcing fiber bundle that has been spread out off-line.

Examples of the method for supplying the epoxy resin composition include a resin bath method; a rotating roll method; a on-paper transfer method; the nozzle dropping method described in JP 09-176346 A, JP 2005-335296 A, and JP 2006-063173 A; and the resin contact and tow transfer method described in JP 08-073630 A, JP 09-031219 A, and JP 8-73630 A.

Among them, due to the control of the amount of supply of the epoxy resin composition or the ease of implementation, a rotating roll method and a resin contact and tow transfer method are preferred as the method for supplying the epoxy resin composition. Furthermore, the width of the reinforcing fiber bundle is usually not stabilized, and there are fluctuations in the way of spreading. Therefore, as described in JP 8-73630 A, it is effective to spread out the reinforcing fiber bundle and then to stabilize the width by narrowing the tow width immediately before the resin contact or during the resin contact. A specific example thereof may be a method of providing grooves having a predetermined width at the resin discharge port or at a position immediately before that, running the reinforcing fiber bundle inside the groove, and thereby narrowing the width of the reinforcing fiber bundle.

For the method for impregnating the reinforcing fiber bundle with the epoxy resin composition, any known impregnation method can be used. Among others, a method of scraping against a heating element such as a heating roll or a hot plate; a method of allowing a reinforcing fiber bundle supplied with an epoxy resin composition to pass through a heating furnace during idle running; and a method of heating with a non-contact heating means such as air electrothermal heating, electric heating, dielectric heating, or infrared heating, are preferred. It is more preferable to have the reinforcing fiber bundle heated with a non-contact heating means, between the time point where the epoxy resin composition is supplied to the reinforcing fiber bundle and the time point where the reinforcing fiber bundle is heated by a heating element, and between a heating element and a heating element, so as to prevent lowering of the temperatures of the reinforcing fiber bundle and the epoxy resin composition.

Furthermore, in regard to the resin impregnation process, it is preferable to add a process of moving the filaments that constitute the reinforcing fiber bundle in a transverse direction (direction perpendicular to the longitudinal direction) by applying an external force to the reinforcing fiber bundle, changing the relative positions between the filaments, and thereby increasing the opportunity of contact between the resin and the filaments. An effect of uniform impregnation equal or superior the impregnation effect based on simple pressurization or the capillary phenomenon can be obtained.

Specifically, resin impregnation is carried out by at least one means of folding the reinforcing fiber bundle, spreading out the reinforcing fiber bundle, shrinking the reinforcing fiber bundle, and twisting the reinforcing fiber bundle. In regard to these means, the folding means and the twisting means tend to narrow the width of the reinforcing fiber, similarly to the width-shrinking means. Also, when a means having an effect of narrowing the width of the reinforcing fiber bundle and a means for widening the width of the reinforcing fiber bundle are used in combination, the effect of uniform impregnation is increased. Meanwhile, twisting may be carried out at the time of resin impregnation, and if a state free of twisting is needed after impregnation, untwisting may be carried out after impregnation. Furthermore, it is false twisting, it is not necessary to perform untwisting, and this is desirable in a case in which an untwisted reinforcing fiber bundle is needed. Furthermore, when scraping is added simultaneously with or immediately after twisting, the width of the reinforcing fiber bundle tends to be widened, and due to the transfer in the thickness direction of the resin, uniformity of impregnation is increased.

In regard to the uniform impregnation by transverse direction movement of filaments, scraping the reinforcing fiber bundle by bringing the reinforcing fiber bundle into contact with a rotating body that rotates at a circumferential speed of less than the running speed of the reinforcing fiber bundle, is useful for the deposition of fluff or cleaning of the roll. If the reinforcing fiber bundle is in a scraped state, the reinforcing fiber bundle will not be entwined on the surface of the rotating body, and since the rotating body is rotating while being rubbed with the reinforcing fiber bundle, the surface contacting with the reinforcing fiber bundle is always in a state of having been cleaned, and this is also useful for an enhancement of the production environment. However, it is preferable to set the circumferential speed of the rotating body to be from 50% to 99% of the running sped of the reinforcing fiber bundle. When the circumferential speed of the rotating body is ½ or more of the running speed of the reinforcing fiber bundle, the reinforcing fiber bundle does not easily undergo fluff generation due to being strongly scraped, and it is not likely to have a problem when the reinforcing fiber is wound up in the subsequent processes, or a tow prepreg that is wound around a paper tube is reeled off.

When the epoxy resin composition is uniformly impregnated into the reinforcing fiber bundle, the mechanical characteristics of the reinforcing fiber composite material thus produced are enhanced, and the effect of the present invention is sufficiently obtained.

It is preferable to have the reinforcing fiber bundle that has been uniformly impregnated with the epoxy resin composition, cooled to about room temperature until the process of winding around a paper tube, using a known cooling means such as scraping with a cooling body or a non-contact cooling means. If the reinforcing fiber bundle is wound in a state of not being sufficiently cooled, since the epoxy resin composition has low viscosity, slipping occurs at the time of winding so that the form of roll is disturbed; or, since a state of elevated temperature is sustained for a relatively long time at the central area, making the escape of heat more difficult, there is a possibility that the pot life of the epoxy resin composition may be shortened.

The tow prepreg of the present invention obtained in this manner has advantages (features) of having excellent reelability from a bobbin, excellent processability and excellent drape properties, and therefore, the tow prepreg is adequate for filament winding molding, pultrusion molding and the like.

<Composite Material-Reinforced Pressure Vessel>

A "composite material-reinforced pressure vessel" means a pressure vessel that has been reinforced with a composite material.

A "composite material" means a fiber-reinforced composite material, and according to the present invention, the composite material means a cured product obtainable by heating (and optionally under pressure) and curing the tow prepreg of the present invention, and then cooling the resultant; or a cured product obtainable by impregnating a reinforcing fiber bundle with the epoxy resin composition of the present invention, subsequently heating (and optionally under pressure) and curing the impregnated fiber bundle without going through the state of prepreg, and then cooling the resultant.

The composite material of the present invention can be used for general industrial applications such as sports goods, automobiles, pressure vessels, airplanes and tendons; however, the composite material is characterized by exhibiting high performance particularly when used in a pressure vessel or a tendon. Particularly, since satisfactory performance as a pressure vessel is obtained by reinforcement using a small amount of the composite material when the composite material is used as a pressure vessel for hydrogen storage or as a pressure vessel to be mounted in a movable body such as a vehicle, a more lightweight pressure vessel can be obtained, and thus, that advantage is most effectively utilized.

The composite material-reinforced pressure vessel of the present invention (hereinafter, may be referred to simply as "pressure vessel of the present invention") is usually formed such that a liner made of a resin or a metal is used in the inner layer of the pressure vessel, and the outer surface of this liner is covered with a composite material layer.

<Liner>

For the liner used in the method for producing the composite material-reinforced pressure vessel of the present invention, a resin liner or a metal liner can be selected and used according to the use.

Meanwhile, the "liner" as used in the present specification and the claims is composed of a tubular body and panels for closing the openings at both ends of the body, and usually, one of the panels at both ends is provided with a metal cap installation area, while the other panel is not provided with a metal cap installation area.

In a pressure vessel for hydrogen storage or a pressure vessel to be mounted in a moving body such as a vehicle, it is preferable to use a resin liner so that the weight of the pressure vessel can be further reduced. Regarding the resin liner, a liner produced by shaping a thermoplastic resin such as high density polyethylene into a vessel shape by rotary molding or blow molding, and attaching a metal cap thereto, can be used. Since a resin liner has relatively low heat resistance, it is required to suppress the reaction heat generation at the time of curing the epoxy resin composition, to a low level. The present invention includes relatively large amounts of components that do not induce a heat generating reaction, such as rubber particles, other than the epoxy resin or the curing agent; therefore, heat generation at the time of curing occurs at a low level, and the present invention can be suitably used even if the liner is made of a resin. Also, a metal liner may be obtained by shaping an aluminum alloy, stainless steel or the like, which is in a pipe shape or a plate shape, into a vessel shape by spinning processing or the like, and then providing a cap shape thereto.

<Filament Winding (FW) Molding>

In regard to the process for forming a composite material layer in the pressure vessel of the present invention, there is available a filament winding (FW) method as a representative method for winding the tow prepreg or a reinforcing fiber bundle that has impregnated with an epoxy resin composition, around a liner.

The filament winding (FW) method is a molding method including paralleling one or plural reinforcing fiber bundles, and continuously winding the reinforcing fiber bundles around a rotating tank liner at a desired tension and at a desired angle, while supplying a matrix resin to impregnate the reinforcing fiber bundles with the matrix resin; or, in the case of using a tow prepreg, paralleling one or plural reinforcing fiber bundles, and continuously winding the reinforcing fiber bundles around a rotating tank liner at a desired tension and at a desired angle, without performing supply and impregnation of a matrix resin.

The filament winding apparatus (FW machine) used in the present invention may be any conventionally known FW machine, and this may a FW machine capable of winding only one reinforcing fiber bundle or tow prepreg around a mandrel or a liner fixed to a mandrel, or may be a FW machine capable of winding plural reinforcing fiber bundles or tow prepregs simultaneously.

In the case of supplying an epoxy resin composition to a reinforcing fiber bundle and impregnating the reinforcing fiber bundle during FW molding, a method of supplying the epoxy resin composition by applying the epoxy resin composition to a certain thickness on a cylindrical drum using a doctor blade or the like and then bringing the fibers into contact thereon, and impregnating the epoxy resin composition into the interior of the reinforcing fiber bundle using a roller or the like; a method of immersing the fibers in a bath of the epoxy resin composition, and then scraping off any unnecessary epoxy resin composition using a bar, a guide or the like; a method of quantitatively transporting the epoxy resin composition using a means such as a dispenser, and thereby applying the epoxy resin composition; and the like may be used, without any particular limitations. Regarding a method of applying the epoxy resin composition by accurately managing the target amount without supplying excess resin to the reinforcing fiber bundle, a method of using a drum or a dispenser is preferred.

The composite material-reinforced pressure vessel of the present invention is a composite material-reinforced pressure vessel produced by a production method including a step of paralleling one or plural reinforcing fiber bundles, and winding the reinforcing fiber bundles around a rotating tank liner at a desired tension and at a desired angle, while supplying a matrix resin and impregnating the reinforcing fiber bundles with the matrix resin; or in the case of using a tow prepreg, a step of paralleling one or plural reinforcing fiber bundles, and winding the reinforcing fiber bundles around a rotating tank liner at a desired tension and at a desired angle without performing supply and impregnation of a matrix resin, and a step of heating (and optionally under pressure) the reinforcing fiber bundles or tow prepreg wound around the tank liner to cure.

In the production of the composite material-reinforced pressure vessel of the present invention, a composite material intermediate that is formed around the outer circumference of the liner forms a layered structure in order to best utilize the features of the composite material intermediate as an anisotropic material.

According to the present invention, the configuration of the layered structure, thicknesses of various layers, and the angle and tension for winding the reinforcing fiber bundle or tow prepreg around a liner, can be freely selected in accordance with the use or shape of the vessel, the kind of the content, and the like.

Since the composite material-reinforced pressure vessel of the present invention can give satisfactory performance as a pressure vessel by reinforcement using a small amount of a composite material, the composite material-reinforced pressure vessel is lightweight and is suitably used particularly as a pressure vessel for hydrogen storage or a pressure vessel to be mounted in a moving body such as a vehicle.

<Other Applications>

Since a composite material produced from the epoxy resin composition of the present invention or from a tow prepreg using this epoxy resin composition, exhibits excellent tensile strength, the composite material is also suitable for the use as a tendon, in addition to the use as a pressure vessel described above.

According to an embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1):

component (A1): at least one epoxy resin selected from the group consisting of an epoxy resin having an aromatic ring in the molecule and an epoxy resin having an aliphatic ring in the molecule;

component (B1): at least one selected from the group consisting of a boron trifluoride-amine complex and a boron trichloride-amine complex; and component (C1): at least one kind of rubber particles selected from the group consisting of crosslinked rubber particles, and core-shell type rubber particles obtained by graft-polymerizing, on the surface of crosslinked rubber particles, a polymer different from the polymer that constitutes the crosslinked rubber particles.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1):

component (A1): at least one component selected from the group consisting of an epoxy resin having a bifunctional aromatic ring in the molecule, an epoxy resin having a trifunctional aromatic ring in the molecule, an epoxy resin having a tetrafunctional aromatic ring in the molecule, a compound in which an aliphatic ring is condensed with an epoxy ring, and a compound in which a substituent containing an epoxy group, such as a glycidyl group, is bonded to an aliphatic ring;

component (B1): at least one component selected from the group consisting of a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-diethylamine complex, a boron trifluoride-dibutylamine complex, a boron trifluoride-piperidine complex, a boron trifluoride-dibenzylamine complex, compounds in which fluorine atoms in the above-mentioned amine complexes are replaced with chlorine atoms, and a boron trichloride-dimethyloctylamine complex component; and component (C1): at least one component selected from the group consisting of butadiene rubber, acrylic rubber, silicone rubber, butyl rubber, NBR, SBR, IR, EPR, and core-shell type rubber particles, and the core-shell type rubber articles are such that the core component is a polymer obtained by polymerizing at least one monomer selected from the group consisting of a vinyl monomer, a conjugated diene-based monomer, an acrylic acid ester-based monomer, and a methacrylic acid ester-based monomer, or a silicone resin; and the shell component is a polymer obtained by polymerizing at least one monomer selected from the group consisting of an acrylic acid ester-based monomer, a methacrylic acid ester-based monomer, and an aromatic vinyl monomer.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1):

component (A1): at least one component selected from the group consisting of a bisphenol A diglycidyl ether type epoxy resin, a bisphenol F diglycidyl ether type epoxy resin, a bisphenol S diglycidyl ether type epoxy resin, a resorcin diglycidyl ether type epoxy resin, a hydroquinone diglycidyl ether type epoxy resin, a terephthalic acid diglycidyl ester type epoxy resin, a bisphenoxyethanol fluorene diglycidyl ether type epoxy resin, a bisphenol fluorene diglycidyl ether type epoxy resin, biscresol fluorene diglycidyl ether type epoxy resin, a novolac type epoxy resin, a N,N,O-triglycidyl-p- or -m-aminophenol type epoxy resin, a N,N,O-triglycidyl-4-amino-m- or -5-amino-o-cresol type epoxy resin, a 1,1,1-(triglycidyloxyphenyl)methane type epoxy resin, a glycidylamine type epoxy resin, 3,4-epoxycyclohexylmethyl carboxylate, hexahydrophthalic acid diglycidyl ester, and methyltetrahydrophthalic acid diglycidyl ester;

component (B1): at least one component selected from the group consisting of a boron trifluoride-piperidine complex and a boron trichloride-dimethyloctylamine compound; and component (C1): at least one component selected from the group consisting of butadiene rubber, and core-shell type rubber particles in which the core component is a crosslinked rubber-like polymer composed of styrene and butadiene, and the shell component is a copolymer of methyl methacrylate and styrene.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1):

component (A1): at least one component selected from the group consisting of a bisphenol A diglycidyl ether type epoxy resin, a bisphenol F diglycidyl ether type epoxy resin, a N,N,N',N'-tetraglycidyldiaminodiphenylmethane, and hexahydrophthalic acid diglycidyl ester;

component (B1): at least one component selected from the group consisting of a boron trifluoride-piperidine complex and a boron trichloride-dimethyloctylamine complex; and component (C1): at least one component selected from the group consisting of butadiene rubber, and core-shell type rubber particles in which the core component is a crosslinked rubber-like polymer composed of styrene and butadiene, and the shell component is a copolymer of methyl methacrylate and styrene.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), and the content of the component (C1) is 12 to 110 parts by mass relative to 100 parts by mass of the component (A1):

component (A1): at least one component selected from the group consisting of an epoxy resin having an aromatic ring in the molecule and a compound in which a substituent containing an epoxy group is bonded to an aliphatic ring;

component (B1): a boron trichloride-amine complex component; and component (C1): at least one kind of rubber particles selected from the group consisting of crosslinked rubber particles, and core-shell type rubber particles in which, on the surface of crosslinked rubber particles, a polymer different from the polymer that constitutes the crosslinked rubber particles is graft-polymerized.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), the content of the component (C1) is 12 to 110 parts by mass relative to 100 parts by mass of the component (A1), and the content of the component (D1) is 1 to 50 parts by mass relative to 100 parts by mass of the component (A1):

component (A1): at least one epoxy resin component selected from the group consisting of an epoxy resin having an aromatic ring in the molecule, and an epoxy resin having an aliphatic ring in the molecule;

component (B1): at least one component selected from the group consisting of a boron trichloride-amine complex and a boron trichloride-amine complex;

component (C1): at least one kind of rubber particles selected from the group consisting of crosslinked rubber particles, and core-shell type rubber particles in which, on the surface of crosslinked rubber particles, a polymer different from the polymer that constitutes the crosslinked rubber particles is graft-polymerized; and component (D1): a polymer which is compatible with an epoxy resin composition containing the components (A1) to (C1), and has a characteristic of forming a phase separation structure when an epoxy resin composition containing the component (D1) is cured.

According to another embodiment of the present invention, there is provided an epoxy resin composition, the epoxy resin composition including components (A1) to (C1) described below, wherein the content of the component (B1) is 8 to 20 parts by mass relative to 100 parts by mass of the component (A1), the content of the component (C1) is 12 to 110 parts by mass relative to 100 parts by mass of the component (A1), and the content of the component (D1) is 1 to 50 parts by mass relative to 100 parts by mass of the component (A1):

component (A1): at least one component selected from the group consisting of a bisphenol A diglycidyl ether type epoxy resin, a bisphenol F diglycidyl ether type epoxy resin, a N,N,N',N'-tetraglycidyldiaminodiphenylmethane, and hexahydrophthalic acid diglycidyl ester;

component (B1): at least one component selected from the group consisting of a boron trifluoride-piperidine complex and a boron trichloride-dimethyloctylamine complex;

component (C1): at least one component selected from the group consisting of butadiene rubber, and core-shell type rubber particles in which the core component is a crosslinked rubber-like polymer composed of styrene and butadiene, and the shell component is a copolymer of methyl methacrylate and styrene; and component (D1): at least one component selected from the group consisting of triblock copolymers and polyamide elastomers.

According to another embodiment of the present invention, there is provided an epoxy resin composition, the epoxy resin composition including components (A2), (B2) and (D2) described below, wherein the content of the component (B2) is 8 to 20 parts by mass relative to 100 parts by mass of the component (A2), the content of the component (D2) is 1 to 50 parts by mass relative to 100 parts by mass of the component (A2):

component (A2): at least one epoxy resin selected from the group consisting of an epoxy resin having an aromatic ring in the molecule and an epoxy resin having an aliphatic ring in the molecule;

component (B2): at least one component selected from the group consisting of a boron trichloride-amine complex and a boron trichloride-amine complex; and component (D2): a polymer which is compatible with an epoxy resin composition containing the components (A2) and (B2) and is capable of forming a phase separation structure in a cured product when an epoxy resin containing the component (D2) is cured.

According to another embodiment of the present invention, there is provided an epoxy resin composition, the epoxy resin composition including components (A2), (B2) and (D2) described below, wherein the content of the component (B2) is 8 to 20 parts by mass relative to 100 parts by mass of the component (A2); and the content of the component (D2) is 1 to 50 parts by mass relative to 100 parts by mass of the component (A2):

component (A2): at least one component selected from the group consisting of an epoxy resin having a bifunctional aromatic ring in the molecule, an epoxy resin having a trifunctional aromatic ring in the molecule, an epoxy resin having a tetrafunctional aromatic ring in the molecule, a compound in which an aliphatic ring is condensed with an epoxy resin, and a compound in which a substituent containing an epoxy group, such as a glycidyl group, is bonded to an aliphatic ring;

component (B2): at least one component selected from the group consisting of a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-diethylamine complex, a boron trifluoride-dibutylamine complex, a boron trifluoride-piperidine complex, a boron trifluoride-dibenzylamine complex, compounds in which fluorine atoms in the above-mentioned amine complexes are replaced with chlorine atoms, and a boron trichloride-dimethyloctylamine complex component; and component (D2): triblock copolymers and polyamide elastomers.

According to another embodiment of the present invention, there is provided an epoxy resin composition, the epoxy resin composition including components (A2), (B2) and (D2) described below, wherein the content of the component (B2) is 8 to 20 parts by mass relative to 100 parts by mass of the component (A2); and the content of the component (D2) is 1 to 50 parts by mass relative to 100 parts by mass of the component (A2):

component (A2): at least one component selected from the group consisting of a bisphenol A diglycidyl ether type epoxy resin, a bisphenol F diglycidyl ether type epoxy resin, a bisphenol S diglycidyl ether type epoxy resin, a resorcin diglycidyl ether type epoxy resin, a hydroquinone diglycidyl ether type epoxy resin, a terephthalic acid diglycidyl ester type epoxy resin, a bisphenoxyethanol fluorene diglycidyl ether type epoxy resin, a bisphenol fluorene diglycidyl ether type epoxy resin, a biscresol fluorene diglycidyl ether type epoxy resin, a novolac type epoxy resin, a N,N,O-triglycidyl-p- or -m-aminophenol type epoxy resin, a N,N,O-triglycidyl-4-amino-m- or -5-amino-o-cresol type epoxy resin, a 1,1,1-(triglycidyloxyphenyl)methane type epoxy resin, a glycidylamine type epoxy resin, a 3,4-epoxycyclohexylmethyl carboxylate, hexahydrophthalic acid diglycidyl ester, and methyltetrahydrophthalic acid diglycidyl ester;

component (B2): at least one component selected from the group consisting of a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-dibenzylamine complex, compounds in which fluorine atoms in the above-mentioned amine complexes are replaced with chlorine atoms, and a boron trichloride-dimethyloctylamine complex component; and component (D2): at least one component selected from the group consisting of a M-B-M-triblock copolymer, a S-B-M triblock copolymer, and a polyamide elastomer, provided that the block M is a homopolymer of polymethyl methacrylate, or a copolymer containing methyl methacrylate at a proportion of at least 50% by mass in terms of monomer relative to the total mass of all the monomers, which is the feed amount of the block M;

the block B is a polymer obtained by polymerizing one or more monomers selected from butadiene, isoprene, 2,3-dimethyl-1,3-butadiene, 1,3-pentadiene, 2-phenyl-1,3-butadiene and (meth)acrylic acid esters as monomers; and the block S is a polymer obtained by polymerizing one or more monomers selected from styrene, α-methylstyrene and vinyltoluene as monomers.

According to another embodiment of the present invention, there is provided an epoxy resin composition, the epoxy resin composition including an epoxy resin, an epoxy resin curing agent which is a boron trihalide-amine complex, and a thermoplastic resin, wherein the epoxy resin is at least one epoxy resin selected from the group consisting of an epoxy resin having an aromatic ring in the molecule and an epoxy resin having an aliphatic ring in the molecule, the epoxy resin curing agent which is a boron trihalide-amine complex is at least one selected from the group consisting of a boron trichloride-amine complex and a boron trichloride-amine complex, the thermoplastic resin is at least one block copolymer selected from the group consisting of a S-B-M triblock copolymer and a M-B-M triblock copolymer, the various blocks represented by S, B and M are linked by covalent bonding, the block M is a homopolymer of polymethyl methacrylate, or a polymer containing methyl methacrylate at a proportion of at least 50% by mass in terms of monomer relative to the total mass of all the monomers, which is the feed amount of the block M, the block B is a block which is non-compatible with the block M and has a glass transition temperature of 20° C. or lower, the block S is a block which is non-compatible with the blocks B and M and has a glass transition temperature higher than the glass transition temperature of the block B, the epoxy resin composition having a characteristic of forming, when the composition is cured, a phase separation structure 1 in which a phase of a cured product of the epoxy resin composition and a phase of the thermoplastic resin constitute a sea-island phase separation structure, and further forming a phase separation structure 2 which is a sea-island phase separation structure, by taking the island structure in the phase separation structure 1 as a sea structure.

According to another embodiment of the present invention, there is provided an epoxy resin composition, the epoxy resin composition including an epoxy resin, an epoxy resin curing agent which is a boron trihalide-amine complex, and a thermoplastic resin, wherein the epoxy resin is at least one component selected from a bisphenol A diglycidyl ether type epoxy resin, a bisphenol F diglycidyl ether type epoxy resin, a bisphenol S diglycidyl ether type epoxy resin, a resorcin diglycidyl ether type epoxy resin, a hydroquinone diglycidyl ether type epoxy resin, a terephthalic acid diglycidyl ester type epoxy resin, a bisphenoxyethanol fluorene diglycidyl ether type epoxy resin, a bisphenol fluorene diglycidyl ether type epoxy resin, a biscresol fluorene diglycidyl ether type epoxy resin, a novolac type epoxy resin, a N,N,O-triglycidyl-p- or -m-aminophenol type epoxy resin, a N,N,O-triglycidyl-4-amino-m- or -5-amino-o-cresol type epoxy resin, a 1,1,1-(triglycidyloxyphenyl)methane type epoxy resin, a glycidylamine type epoxy resin, a 3,4-epoxycyclohexylmethyl carboxylate, hexahydrophthalic acid diglycidyl ester, and methyltetrahydrophthalic acid diglycidyl ester;

the epoxy resin curing agent which is a boron trihalide-amine complex, is at least one component selected from the group consisting of a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-dibenzylamine complex, compounds in which fluorine atoms in the above-mentioned amine complexes are replaced with chlorine atoms, and a boron trichloride-dimethyloctylamine complex component;

the thermoplastic resin is at least one block copolymer selected from the group consisting of a S-B-M triblock copolymer and a M-B-M triblock copolymer, in which the various blocks represented by S, B and M are linked by covalent bonding;

the block M is a homopolymer of polymethyl methacrylate, or a polymer containing methyl methacrylate at a proportion of at least 50% by mass in terms of monomer relative to the total mass of all the monomers, which is the feed amount of the block M;

the block B is a block which is non-compatible with the block M and has a glass transition temperature of 20° C. or lower;

the block S is a block which is non-compatible with the blocks B and M and has a glass transition temperature higher than the glass transition temperature of the block B, the epoxy resin composition having a characteristic of forming, when the composition is cured, a phase separation structure 1 in which a phase of a cured product of the epoxy resin composition and a phase of the thermoplastic resin constitute a sea-island phase separation structure, and further forming a phase separation structure 2 which is a sea-island phase separation structure, by taking the island structure in the phase separation structure 1 as a sea structure.

According to another embodiment of the present invention, there is provided an epoxy resin composition, the epoxy resin composition including an epoxy resin, an epoxy resin curing agent which is a boron trihalide-amine complex, a thermoplastic resin, and rubber particles, wherein the epoxy resin is at least one component selected from a bisphenol A diglycidyl ether type epoxy resin, a bisphenol F diglycidyl ether type epoxy resin, a bisphenol S diglycidyl ether type epoxy resin, a resorcin diglycidyl ether type epoxy resin, a hydroquinone diglycidyl ether type epoxy resin, a terephthalic acid diglycidyl ester type epoxy resin, a bisphenoxyethanol fluorene diglycidyl ether type epoxy resin, a bisphenol fluorene diglycidyl ether type epoxy resin, a biscresol fluorene diglycidyl ether type epoxy resin, a novolac type epoxy resin, a N,N,O-triglycidyl-p- or -m-aminophenol type epoxy resin, a N,N,O-triglycidyl-4-amino-m- or -5-amino-o-cresol type epoxy resin, a 1,1,1-

(triglycidyloxyphenyl)methane type epoxy resin, a glycidylamine type epoxy resin, a 3,4-epoxycyclohexylmethyl carboxylate, hexahydrophthalic acid diglycidyl ester, and methyltetrahydrophthalic acid diglycidyl ester;

the epoxy resin curing agent which is a boron trihalide-amine complex, is at least one component selected from the group consisting of a boron trifluoride-aniline complex, a boron trifluoride-p-chloroaniline complex, a boron trifluoride-ethylamine complex, a boron trifluoride-isopropylamine complex, a boron trifluoride-benzylamine complex, a boron trifluoride-dimethylamine complex, a boron trifluoride-dibenzylamine complex, compounds in which fluorine atoms in the above-mentioned amine complexes are replaced with chlorine atoms, and a boron trichloride-dimethyloctylamine complex component;

the thermoplastic resin is at least one block copolymer selected from the group consisting of a S-B-M triblock copolymer and a M-B-M triblock copolymer, in which the various blocks represented by S, B and M are linked by covalent bonding;

the block M is a homopolymer of polymethyl methacrylate, or a polymer containing methyl methacrylate at a proportion of at least 50% by mass in terms of monomer relative to the total mass of all the monomers, which is the feed amount of the block M;

the block B is a block which is non-compatible with the block M and has a glass transition temperature of 20° C. or lower;

the block S is a block which is non-compatible with the blocks B and M and has a glass transition temperature higher than the glass transition temperature of the block B, the rubber particles are at least one component selected from the group consisting of butadiene rubber, and core-shell type rubber particles in which the core component is a crosslinked rubber-like polymer composed of styrene and butadiene, and the shell component is a copolymer of methyl methacrylate and styrene, the epoxy resin composition having a characteristic of forming, when the composition is cured, a phase separation structure 1 in which a phase of a cured product of the epoxy resin composition and a phase of the thermoplastic resin constitute a sea-island phase separation structure, and further forming a phase separation structure 2 which is a sea-island phase separation structure, by taking the island structure in the phase separation structure 1 as a sea structure.

EXAMPLES

Hereinafter, the present invention will be described in more detail by way of Examples and Comparative Examples, but the present invention is not intended to be limited to these.

Examples and Comparative Examples

The raw materials of the resin compositions used in the various examples, the preparation method, and the method for measuring various properties will be described below. The compositions of various epoxy resin compositions, and the results for the measurement of properties are summarized in Table 1 for the Examples, and in Table 2 for the Comparative Examples. Meanwhile, the values for the various components in Table 1 and Table 2 represent the parts by mass of the various components incorporated into epoxy resin compositions.

<Raw Material>

The following raw materials were used in Examples and Comparative Examples.

<Component (A)> jER828

"Product name" jER828

"Component" Bisphenol A type epoxy resin (bifunctional epoxy resin) (bifunctional epoxy resin) (epoxy equivalent: 189 g/eq, 120 Poise/25° C.)

"Manufacturer" Mitsubishi Chemical Corp.

jER807

"Product name" jER807

"Component" Bisphenol F type epoxy resin (bifunctional epoxy resin) (epoxy equivalent: 175 g/eq, 45 Poise/25° C.)

"Manufacturer" Mitsubishi Chemical Corp.

jER1002

"Product name" jER1002

"Component" Bisphenol A type epoxy resin (bifunctional epoxy resin) (epoxy equivalent: 700 g/eq, softening point: 78° C.)

"Manufacturer" Mitsubishi Chemical Corp.

jER604

"Product name" jER604

"Component" Tetraglycidyldiaminodiphenylmethane (TGDDM) type epoxy resin (tetrafunctional epoxy resin) (epoxy equivalent: 130 g/eq, 100 Poise/50° C.)

"Manufacturer" Mitsubishi Chemical Corp.

YDF-2001

"Product name" YDF-2001

"Component" Bisphenol F type epoxy resin (bifunctional resin, epoxy equivalent: 475 g/eq)

"Manufacturer" Nippon Steel & Sumikin Chemical Co., Ltd.

2021P

"Product name" CELLOXIDE 2021P

"Component" 3,4-Epoxycyclohexylmethyl carboxylate (bifunctional epoxy resin, epoxy equivalent: 137 g/eq)

"Manufacturer" Daicel Corp.

CY-184

"Product name" ARALDITE CY-184

"Component" Hexahydrophthalic acid diglycidyl ester type epoxy resin (epoxy equivalent: 151 g/eq)

"Manufacturer" Huntsman Japan K.K.

<Master Batch Type Rubber Particle-Dispersed Epoxy Resin in which Component (C) is Dispersed in Epoxy Resin as Component (A)>

MX-125

"Product name" KANE ACE MX-125

"Component" Bisphenol A type epoxy resin (bifunctional epoxy resin, epoxy equivalent: 189 g/eq): 75% by mass, butadiene-based core-shell type rubber particles (volume average particle size: 100 nm): 25% by mass "Manufacturer" Kaneka Corp.

MX-113

"Product name" KANE ACE MX-113

"Component" Bisphenol A type epoxy resin (bifunctional epoxy resin, epoxy equivalent: 189 g/eq): 66% by mass, butadiene-based core-shell type rubber particles (volume average particle size: 100 nm): 33% by mass "Manufacturer" Kaneka Corp.

MX-154

"Product name" KANE ACE MX-154

"Component" Bisphenol A type epoxy resin (bifunctional epoxy resin, epoxy equivalent: 189 g/eq): 60% by mass, butadiene-based core-shell type rubber particles (volume average particle size: 100 nm): 40% by mass "Manufacturer" Kaneka Corp.

MX-416

"Product name" KANE ACE MX-416

"Component" TGDDM type epoxy resin (tetrafunctional epoxy resin, epoxy equivalent: 112 g/eq): 75% by mass, butadiene-based core-shell type rubber particles (volume average particle size: 100 nm): 25% by mass

MX-960

"Product name" KANE ACE MX-960

"Component" Bisphenol A type epoxy resin (bifunctional epoxy resin, epoxy equivalent: 189 g/eq): 75% by mass, silicone-based core-shell type rubber particles (volume average particle size: 300 nm): 25% by mass "Manufacturer" Kaneka Corp.

BPA328

"Product name" ACRYSET BPA328

"Component" Bisphenol A type epoxy resin (bifunctional epoxy resin, epoxy equivalent: 189 g/eq): 83.3% by mass, acrylic rubber particles (volume average particle size: 300 nm): 16.7% by mass "Manufacturer" Nippon Shokubai Co., Ltd.

BPF307

"Product name" ACRYSET BPF307

"Component" Bisphenol F type epoxy resin (bifunctional epoxy resin, epoxy equivalent: 175 g/eq): 83.3% by mass, acrylic rubber particles (volume average particle size: 300 nm): 16.7% by mass "Manufacturer" Nippon Shokubai Co., Ltd.

<Component (B)>

DY9577

"Product name" DY9577

"Component" Boron trichloride-amine complex

"Manufacturer" Huntsman Japan K.K.

ANCHOR 1115

"Product name" ANCHOR 1115

"Component" Boron trifluoride-amine complex

"Manufacturer" PTI Japan Corp.

<Component (C)>

J-5800

"Product name" METABLEN J-5800

"Component" Acrylic core-shell rubber particles (volume average particle size: 500 to 600 nm)

"Manufacturer" Mitsubishi Rayon Co., Ltd.

W-5500

"Product name" METABLEN J-5800

"Component" Acrylic core-shell rubber particles (volume average particle size: 500 to 600 nm)

"Manufacturer" Mitsubishi Rayon Co., Ltd.

SRK-200E

"Product name" METABLEN SRK-200E

"Component" Silicone-based core-shell rubber particles (volume average particle size: 100 to 300 nm)

"Manufacturer" Mitsubishi Rayon Co., Ltd.

AC-4030

"Product name" STAPHYLOID AC-4030

"Component" Acrylic core-shell rubber particles (volume average particle size: 500 nm)

"Manufacturer" Aica Kogyo Co., Ltd.

<Component (D)>

M52N

"Product name" NANOSTRENGTH M52N

"Component" Block copolymer of methyl methacrylate and butyl acrylate

"Manufacturer" Arkema S.A.

TPAE-32

"Product name" TPAE-32

"Component" Polyamide elastomer

"Manufacturer" T&K Toka Corp.

YP50S

"Product name" YP50S

"Component" Phenoxy resin

"Manufacturer" Nippon Steel & Sumikin Chemical Co., Ltd.

<Other Raw Materials>

(Curing agent)

DICY7

"Product name" jER CURE DICY7

"Component" Dicyandiamide

"Manufacturer" Mitsubishi Chemical Corp.

PN-23J

"Product name" AMICURE PN-23J

"Component" Epoxy resin amine adduct

"Manufacturer" Ajinomoto Fine-Techno Co., Inc.

MY-24

"Product name" AMICURE MY-24

"Component" Epoxy resin amine adduct

"Manufacturer" Ajinomoto Fine-Techno Co., Inc.

2E4MZ

"Product name" CUREZOL 2E4MZ

"Component" 2-Ethyl-4-methylimidazole

"Manufacturer" Shikoku Chemicals Corp.

2P4MHZ

"Product name" CUREZOL 2P4MHZ-PW

"Component" 2-Phenyl-4-methyl-5-hydroxymethylimidazole

"Manufacturer" Shikoku Chemicals Corp.

HX-3722

"Product name" NOVACURE HX-3722

"Component" Bisphenol A type liquid epoxy resin: 65% by mass, microencapsulated amine-based curing agent: 35% by mass "Manufacturer" Asahi Kasei Chemicals Corp.

(Curing aid)

DCMU99

"Product name" DCMU99

"Component" 2,4-Toluenebis(dimethylurea)

"Manufacturer" Hodogaya Chemical Co., Ltd.

OMICURE 24

"Product name" OMICURE 24

"Component" 2,4-Toluenebis(dimethylurea)

"Manufacturer" PTI Japan Corp.

<Preparation of Resin Composition of Example 1>

An epoxy resin composition having the composition described in Table 1 was prepared.

CY-184 and M52N were weighed in a flask, and while the flask was heated in an oil bath at 145° C. to 155° C., the content of the flask was stirred until the content became uniform. Thereafter, the flask was removed from the oil bath, the flask was left to cool until the temperature of the content reached 60° C. or lower, and the remaining raw materials were weighed and added to the flask. Subsequently, while the flask was heated in a water bath at 55° C. to 65° C., the content of the flask was stirred until the content became uniform, and thus an epoxy resin composition was obtained.

<Preparation of Resin Composition of Comparative Example 1>

An epoxy resin composition having the composition described in Table 1 was prepared.

The entire amounts of DICY7 and OMICURE 24 were dispersed in a portion of jER828 using a three-roll. The jER828 having DICY7 and OMICURE 24 dispersed therein, and the remaining portion of jER828 were introduced into a flask, and while the flask was heated to 40° C. to 50° C., the content of the flask was stirred until the content became uniform.

For the epoxy resin compositions obtained in Example 1 and Comparative Example 1, storage stability and curability were measured by the following methods, and for the cured resins of the respective compositions, the glass transition temperature and KIc were measured. The results are presented in Table 1.

<Examination of Storage Stability>

Storage stability was examined by checking the changes in viscosity at 23° C. and tackiness of an epoxy resin composition measured before and after the exposure of the epoxy resin composition to the conditions described below.

Exposed conditions
Temperature: 23° C.
Humidity: 50% RH

<Examination of Curability of Epoxy Resin Composition>

13 g of an epoxy resin composition was weighed in an aluminum cup having a diameter of 50 mm, the epoxy resin composition was heated in an air heating furnace, and the feasibility of curing was checked.

Conditions for temperature elevation: temperature elevated from room temperature to the curing temperature at a rate of 2° C./min Curing conditions: Stored for 2 hours at 110° C., or stored for 2 hours at 135° C.

Conditions for temperature lowering: natural cooling from the curing temperature to 50° C. or lower Air heating furnace: ETAC HT-310S (manufactured by Kusumoto Chemicals, Ltd.)

<Production of Cured Plate of Epoxy Resin Composition>

Each of the epoxy resin compositions thus prepared was poured between two sheets of glass plates, with a spacer having a thickness of 2 mm or 3 mm disposed therebetween. The temperature was increased up to 110° C. or 135° C. at a rate of 2° C./min, subsequently the temperature inside the furnace was maintained at 110° C. or 135° C., and the epoxy resin composition was cured for 2 hours. Thereby, a cured plate of the epoxy resin composition was produced.

<Measurement of Glass Transition Temperature of Cured Product>

Figure 2:
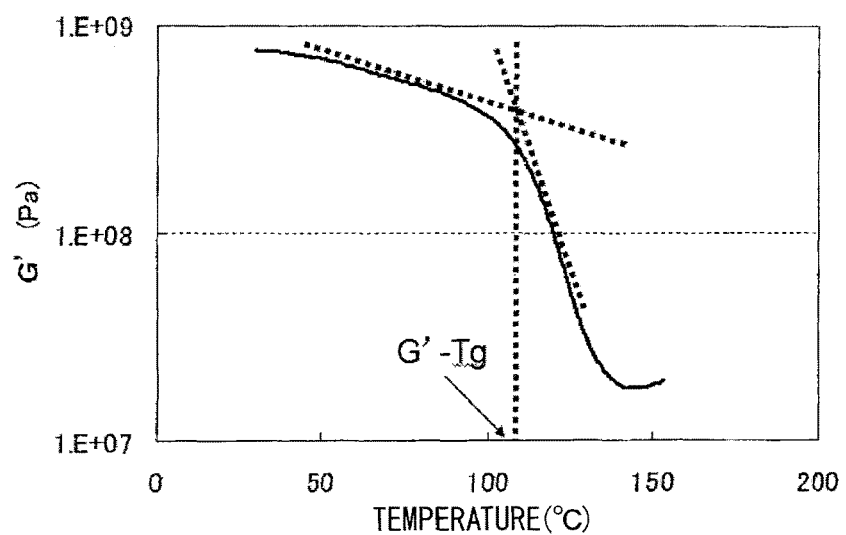
FIG. 2 is a graph diagram explaining the method for <Measurement of glass transition temperature of cured product> in Examples of the present invention, and is a graph diagram illustrating an example of plotting log G' of the cured product (cured plate) against temperature and determining (G'-Tg) from an intersection between an approximating straight line for a flat region before the transition of log G' and an approximating straight line for the region where transition of G' occurs.

For the cured plates obtained in the above section <Production of cured plate of epoxy resin composition>, the glass transition temperatures (G'-Tg) were measured by a DMA method (Dynamic Mechanical Analysis). Specifically, as illustrated in the graph of FIG. 2, log G' was plotted against temperature, and the temperature determined from the intersection between an approximating straight line for a flat region before the transition of log G' and an approximating straight line for the region where transition of G' occurs, was recorded as G'-Tg.

Measurement Conditions

Apparatus: ARES-RDA (manufactured by TA Instruments, Inc.)

Rate of temperature elevation: 5° C./min
Measurement frequency: 1 Hz
Strain: 0.5%
Measurement temperature range: about 30° C. to about 200° C.
Sample size: 55 mm in length, 12.7 mm in width, 2 mm in thickness <Measurement of KIc (Fracture Toughness Value) of Cured Resin>

Production of a specimen and a test were carried out according to the SENB (Single Edge Notched Bend) testing method according to ASTM D5045, in an environment at a temperature of 20° C. and a humidity of 50% RH (relative humidity). Each of the epoxy resin compositions of Examples and Comparative Examples was cured under the same heating conditions as the conditions for the examination of curability, and from a cured resin plate having a thickness of 3 mm thus obtained, a small piece having a predetermined dimension (27 mm×3 mm×6 mm) was cut out. A notch was inserted in the small piece with a wet type diamond cutter, and a razor that had been degreased in MEK (methyl ethyl ketone) was caused to slide while the razor was pressed against an edge of the notch, to form a precrack. Thus, a specimen was produced. The specimen thus formed was subjected to a fracture toughness test with a universal testing machine (manufactured by Instron, Inc., 4465).

The epoxy resin composition of Example 1 could be cured at 110° C., and the heat resistance of the cured product was 100° C. or higher, while KIc was 0.8 MPa/m$^{0.5}$ or more. Thus, the properties were all excellent.

Furthermore, even after the specimen was exposed to an environment at 23° C. and 50% RH for one month, no change was observed in the resin viscosity, and storage stability was also satisfactory.

TABLE 1

| Raw material | | | Example 1 | Comparative Example 1 |
|---|---|---|---|---|
| Master batch with component (C) dispersed in epoxy resin as component (A) | MX-113 | Bisphenol A type epoxy resin | 22.1 | 0.0 |
| | | Rubber particles: Core-shell type rubber particles | 10.9 | 0.0 |
| | MX-416 | Tetrafunctional epoxy resin | 12.7 | 0.0 |
| | | Rubber particles: Core-shell type rubber particles | 4.3 | 0.0 |
| Component (A) | CY184 | Alicyclic diglycidyl ester type epoxy resin | 50.0 | 0.0 |
| | jER828 | Bisphenol type epoxy resin | 0.0 | 100.0 |
| Component (B) | DY9577 | Boron trichloride-amine complex | 10.0 | 0.0 |
| Component (D) | M52N | Copolymer of MMA and butyl acrylate | 7.0 | 0.0 |
| Other raw materials | DICY7 | Dicyandiamide | 0.0 | 4.4 |
| | OMICURE 24 | 2,4-Toluenebis(dimethylurea) | 0.0 | 1.5 |
| Evaluation results | Curing at 110° C. | | Feasible | Infeasible |
| | Glass transition temperature (° C.) upon curing at 110° C. | | 103.0 | — |
| | KIc (MPa/m 0.5) upon curing at 110° C. | | 1.1 | — |
| | Curing at 135° C. | | Feasible | Infeasible |
| | Glass transition temperature (° C.) upon curing at 135° C. | | 125.0 | 132.0 |
| | KIc (MPa/m 0.5) upon curing at 135° C. | | 1.0 | 0.6 |
| | Storage stability | | 1 Month or more | 1 Month or more |

<Preparation of Resin Composition of Example 2>

In a 2-liter flask, 1000 g of MX-154, which is a master batch type rubber particle-dispersed epoxy resin having the component (C) dispersed in the epoxy resin of the component (A), was weighed, and then 65 g of DY9577 as the component (B) was weighed and added thereto. While the flask was heated in an oil bath at 60° C., the content of the flask was stirred for 20 minutes and uniformly mixed. The flask was removed from an oil bath, and the flask was left to cool until the temperature of the content reached 40° C. or lower. Thus, an epoxy resin composition of Example 2 was obtained.

<Preparation of Resin Composition of Example 3>

2.00 kg of MX-113, which is a master batch type rubber particle-dispersed epoxy resin having the component (C) dispersed in the epoxy resin of the component (A), was weighed, and then 600 g of J-5800 as the component (C) was added thereto. The mixture was kneaded and dispersed using a three-roll mill. Subsequently, in a 2-liter flask, 1.30 kg of this kneaded dispersion was weighed, and then 100 g of DY9577 as the component (B) was weighed and added thereto. While the flask was heated in an oil bath at 60° C., the content was stirred for 20 minutes and uniformly mixed. The flask was removed from the oil bath, and the flask was left to cool until the temperature of the content reached 40° C. or lower. Thus, an epoxy resin composition of Example 3 was obtained.

<Preparation of Resin Composition of Example 4>

In a 2-liter flask, 500 g of MX-154, which is a master batch type rubber particle-dispersed epoxy resin having the component (C) dispersed in the epoxy resin of the component (A), and 500 g of jER828 as the component (A) were weighed, and then 70 g of DY9577 as the component (B) was weighed and added thereto. While the flask was heated in an oil bath at 60° C., the content of the flask was stirred for 20 minutes and uniformly mixed. The flask was removed from an oil bath, and the flask was left to cool until the temperature of the content reached 40° C. or lower. Thus, an epoxy resin composition of Example 3 was obtained.

<Preparation of Resin Composition of Example 5>

In a 2-liter flask, 750 g of MX-113, which is a master batch type rubber particle-dispersed epoxy resin having the component (C) dispersed in the epoxy resin of the component (A), and 250 g of jER828 as the component (A) were weighed, and then 100 g of DY9577 as the component (B) was weighed and added thereto. While the flask was heated in an oil bath at 60° C., the content of the flask was stirred for 20 minutes and uniformly mixed. The flask was removed from an oil bath, and the flask was left to cool until the temperature of the content reached 40° C. or lower. Thus, an epoxy resin composition of Example 5 was obtained.

<Preparation of Resin Composition of Example 6>

In a 2-liter flask, 1 kg of MX-154, which is a master batch type rubber particle-dispersed epoxy resin having the component (C) dispersed in the epoxy resin of the component (A), was weighed, and then 100 g of DY9577 as the component (B) was weighed and added thereto. While the flask was heated in an oil bath at 60° C., the content of the flask was stirred for 20 minutes and uniformly mixed. The flask was removed from an oil bath, and the flask was left to cool until the temperature of the content reached 40° C. or lower. Thus, an epoxy resin composition of Example 6 was obtained.

<Preparation of Resin Composition of Example 7>

In a 2-liter flask, 400 g of MX-154 and 100 g of MX-416, which are master batch type rubber particle-dispersed epoxy resins having the component (C) dispersed in the epoxy resins of the component (A), and 150 g of jER828, 250 g of jER807, and 100 g of jER604 as the component (A) were weighed, and then 100 g of DY9577 as the component (B) was weighed and added thereto. While the flask was heated in an oil bath at 60° C., the content of the flask was stirred for 20 minutes and uniformly mixed. The flask was removed from an oil bath, and the flask was left to cool until the temperature of the content reached 40° C. or lower. Thus, an epoxy resin composition of Example 7 was obtained.

<Preparation of Resin Composition of Comparative Example 2>

500 g of jER828, 200 g of DICY7, and 75 g of DCMU99 were weighed in a container, and the mixture was mixed using a spatula. This mixture was kneaded using a three-roll mill, and thus a resin mixture A having DICY7 and DCMU99 uniformly dispersed in jER828 was obtained.

In a 2-liter flask, 900 g of jER828 was weighed, and then 155 g of the resin mixture A previously prepared was weighed and added thereto. This mixture was stirred and mixed for 20 minutes, and thereby a resin composition of Comparative Example 2 was obtained.

<Preparation of Resin Composition of Comparative Example 3>

In a 2-liter flask, 100 g of jER1002 and 900 g of jER604 as the component (A) were weighed, and while the flask was heated in an oil bath at 120° C., the content of the flask was uniformly mixed by stirring for 30 minutes. The flask was left to cool until the temperature of the content reached 60° C. or lower. Furthermore, 60 g of DY9577 as the component (B) was weighed and added to this 2-liter flask, and while the flask was heated in an oil bath at 60° C., the content was stirred for 20 minutes and uniformly mixed. The flask was removed from the oil bath, and the flask was left to cool until the temperature of the content reached 40° C. or lower. Thus, an epoxy resin composition of Comparative Example 3 was obtained.

For the epoxy resin compositions obtained in Examples 2 to 7 and Comparative Examples 2 and 3, storage stability and curability were measured by the same methods as described above. Furthermore, composite material-reinforced pressure vessels were produced using the respective compositions, and the burst pressures were measured. The results are presented in Table 2 and Table 3.

<Production of Composite Material-Reinforced Pressure Vessel>

A composite material-reinforced pressure vessel for evaluation was produced by the following procedure.

A high strength carbon fiber manufactured by Grafil, Inc., product name: 37-800 (tensile strength: 5300 MPa, tensile modulus: 255 GPa), which was impregnated with an epoxy resin composition to a resin content of 24% (that is, a tow prepreg produced according to the section <Production of tow prepreg> described below), was wound around an aluminum liner having an outer diameter of 160 mm and a length of 515 mm (capacity 9 liters, see FIG. 1 for the shape) using a filament winding apparatus. The aluminum liner used was made of a material obtained by heat treating the aluminum material defined in JIS H4040 A6061-T6, and the thickness of the body was about 3.3 mm.

The tow prepreg was wound around the aluminum liner after the position was adjusted using a guide roll. First, for a first layer that is brought into contact with the body of the aluminum liner, a hoop layer forming an angle of 88.6° with respect to the direction of the rotating axis was formed on the body to a thickness of 0.63 mm. Thereafter, a helical layer for reinforcing the panels of the liner was laminated at an angle of 14° with respect to the direction of the rotating axis, and the tow prepreg was wound such that the thickness of the fiber-reinforced resin layer of the body would be 2.5 mm. Meanwhile, the thickness of the fiber-reinforced resin layer was determined by measuring the outer diameter using vernier calipers.

The liner having the fiber-reinforced resin layer formed thereon by the above procedure was removed from the filament winding apparatus and was suspended in an air heating furnace, and the temperature inside the furnace was increased to 110° C. at a rate of 2° C./min. After it was confirmed that the surface temperature of the fiber-reinforced resin layer reached 110° C., the temperature inside the furnace was maintained at 110° C. for 2 hours, and thus the epoxy resin composition was cured. Thereafter, the temperature inside the furnace was cooled to 60° C. at a rate of 1° C./min, and a composite material-reinforced pressure vessel (9-L tank) was obtained.

<Production of Tow Prepreg>

A tow prepreg was produced using each of the epoxy resin compositions obtained in Examples and Comparative Examples described above, and a high strength carbon fiber manufactured by Grafil, Inc., product name: 37-800 (tensile strength: 5300 MPa, tensile modulus: 255 GPa).

First, the carbon fiber was heated to 50° C. to 100° C., and the carbon fiber was spread to a width of 11 to 15 mm.

To the carbon fiber thus spread (hereinafter, simply referred to as "carbon fiber bundle"), an epoxy resin composition adjusted to 65° C. was quantitatively supplied using an epoxy resin composition supplying apparatus, and the carbon fiber bundle was uniformly impregnated with the epoxy resin composition using a resin impregnation apparatus composed of heating rolls. As one of the impregnation means for uniformly impregnating the reinforcing fiber bundle with the epoxy resin composition, a method of moving the filaments in a transverse direction was employed.

This was cooled to room temperature, and then was wound around a bobbin.

<Method for Measuring Burst Pressure>

The pressure vessel was mounted on a hydraulic fracturing testing machine, the pressure vessel was filled with water, and then hydraulic pressure was exerted on the pressure vessel at a rate of pressure increase of 15 MPa/min. The hydraulic pressure at the time when the pressure vessel was burst was recorded, and this was designated as the actually measured burst pressure of the pressure vessel.

Furthermore, for the hoop stress, it was assumed that there was no resistance against the internal pressure of the liner, that is, the stress in the diameter direction of the hoop layer in contact with the liner and the burst pressure of the pressure vessel were equal, and it was also assumed that the elastic modulus in the circumferential direction of the helical layer was negligibly small, that is, the hoop stress at the outermost layer surface of the hoop layer was zero. Thereby, the hoop stress in an arbitrary hoop layer can be obtained by the calculation formula for the hoop stress of a thick-walled cylinder as described in Formula (1).

$$\sigma = (P \times r_1^2 \times (r_2^2 + r^2))/(r^2 \times (r_2^2 - r_1^2))$$ Formula (1)

σ: Hoop stress (MPa) of thick-walled cylinder
P: Internal pressure (MPa) of pressure vessel
r: Arbitrary radius (mm) from the center in a cross-section perpendicular to the axis of the pressure vessel
$r_1$: Radius (mm) from the center in a cross-section perpendicular to the axis of the pressure vessel to the inner wall of the pressure vessel
$r_2$: Radius (mm) from the center in a cross-section perpendicular to the axis of the pressure vessel to the outer wall of the pressure vessel.

Here, the tank internal pressure in a case in which the fracture hoop stress of the hoop layer that is in contact with the liner, which is calculated based on the actually measured burst pressure (actual value) of a tank in which the thickness of the hoop layer measured as described above is 0.63 mm, and the hoop stress of the hoop layer that is in contact with the liner, of a tank having a hoop thickness of 2.80 mm are equal, is designated as the burst pressure (calculated value). When the burst pressure (calculated value) exceeded 158 MPa, which was a value obtained by multiplying 70 MPa, which is a requirement for a composite material-reinforced pressure vessel (9-L tank), by a safety ratio of 2.25 times, it was considered acceptable.

TABLE 2

| | Raw material | | Example 2 | Example 3 | Example 4 | Example 5 | Example 6 | Example 7 |
|---|---|---|---|---|---|---|---|---|
| | Component (A) | jER828 | 0 | 0 | 50 | 25 | 0 | 15 |
| | | jER807 | 0 | 0 | 0 | 0 | 0 | 25 |
| | | jER1002 | 0 | 0 | 0 | 0 | 0 | 0 |
| | | jER604 | 0 | 0 | 0 | 0 | 0 | 10 |
| Master batch with component (C) dispersed in epoxy resin as component (A) | | MX-113 | 0 | 100 | 0 | 75 | 0 | 0 |
| | | MX-154 | 100 | 0 | 50 | 0 | 100 | 40 |
| | | MX-416 | 0 | 0 | 0 | 0 | 0 | 10 |
| | Component (B) | DY9577 | 6.5 | 10 | 7.0 | 10 | 10 | 10 |
| | Component (C) | J-5800 | 0 | 30 | 0 | 0 | 0 | 0 |
| Experiment | Component (B) per 100 parts by mass of epoxy resin | (phr) | 10.8 | 14.9 | 8.8 | 13.3 | 16.7 | 12.3 |
| | Component (C) per 100 parts by mass of epoxy resin | (phr) | 66.7 | 94.0 | 25.0 | 32.9 | 66.7 | 22.7 |
| | Particle size of component (C) | (nm) | 100 | 100 700 | 100 | 100 | 100 | 100 |
| | Curing temperature | (° C.) | 110 | 110 | 110 | 110 | 110 | 110 |
| Evaluation results | Curing at 110° C. | | Feasible | Feasible | Feasible | Feasible | Feasible | Feasible |
| | Curing at 135° C. | | Feasible | Feasible | Feasible | Feasible | Feasible | Feasible |
| | Storage stability | | 2 Weeks or more | 2 Weeks or more | 2 Weeks or more | 2 Weeks or more | 2 Weeks or more | 2 Weeks or more |
| | Burst pressure (actual value) | (Mpa) | 42 | 39 | 42 | 40 | 41 | 39 |
| | Burst pressure (calculated value) | (Mpa) | 182 | 167 | 181 | 174 | 178 | 168 |

TABLE 3

| Raw material | | | Comparative Example 2 | Comparative Example 3 |
|---|---|---|---|---|
| Component (A) | jER828 | | 100 | 0 |
| | jER807 | | 0 | 0 |
| | jER1002 | | 0 | 10 |
| | jER604 | | 0 | 90 |
| Component (B) | DY9577 | | 0 | 6.0 |
| Other raw material (curing agent) | DICY7 | | 4.0 | 0 |
| Other raw material (curing aid) | DCMU99 | | 1.5 | 0 |
| Experiment | Component (B) per 100 parts by mass of epoxy resin | (phr) | 0 | 6.0 |
| | Component (C) per 100 parts by mass of epoxy resin | (phr) | 0 | 0 |
| | Curing temperature | (° C.) | 135 | 135 |
| Evaluation results | Curing at 110° C. | | Infeasible | Feasible |
| | Curing at 135° C. | | Feasible | Feasible |
| | Storage stability | | 2 Weeks or more | 2 Weeks or more |
| | Burst pressure (actual value) | (Mpa) | 32 | 34 |
| | Burst pressure (calculated value) | (Mpa) | 139 | 147 |

<Preparation of Resin Compositions of Examples 8, 9, 11, 12, 14 to 16, 18, 20, 21, 26, 27, 29, 30, 32 and 37, and Comparative Examples 9, 10, 13 and 14>

All the raw materials were weighed in a flask, and then while the flask was heated in a water bath at 45° C. to 60° C., the content of the flask was stirred until the raw materials fed to the flask became sufficiently uniform under visual inspection. Thus, epoxy resin compositions were obtained.

<Preparation of Resin Compositions of Examples 31 and 33>

The entire amount of the component (C) was dispersed in a portion of a master batch of the component (A) and the component (C) using a three-roll mill. The portion of the master batch of the component (A) and the component (C) in which the entire amount of the component (C) was dispersed, the remaining portion of the master batch of the component (A) and the component (C), and the component (B) were weighed in a flask, and then while the flask was heated in a water bath at 45° C. to 60° C., the content of the flask was stirred until the raw materials fed to the flask became sufficiently uniform under visual inspection. Thus, epoxy resin compositions were obtained.

<Preparation of Resin Compositions of Examples 10 and 22 to 25>

The entire amount of the component (C) was dispersed in a portion of the component (A) using a three-roll mill. The portion of the component (A) in which the entire amount of the component (C) was dispersed, the remaining portion of the component (A), and the component (B) were weighed in a flask, and then while the flask was heated in a water bath at 45° C. to 60° C., the content of the flask was stirred until the raw materials fed to the flask became sufficiently uniform under visual inspection. Thus, epoxy resin compositions were obtained.

<Preparation of Resin Compositions of Examples 13, 17, 28 and 36, and Comparative Example 11>

The component (A), a master batch of the component (A) and the component (C), and the component (D) were weighed in a flask, and then while the flask was heated in an oil bath at 150° C. to 160° C., the content of the flask was stirred until the content became sufficiently uniform under visual inspection. Thereafter, the flask was removed from the oil bath, the flask was left to cool until the temperature of the content reached 60° C. or lower, and the remaining raw materials were weighed and added to the flask. Subsequently, while the flask was heated in a water bath at 45° C. to 60° C., the content of the flask was stirred until the content became sufficiently uniform under visual inspection. Thus, epoxy resin compositions were obtained.

<Preparation of Resin Compositions of Examples 19, 34, 35 and 38, and Comparative Examples 12 and 15>

The component (A) and the component (D) were weighed in a flask, and then while the flask was heated in an oil bath at 150° C. to 160° C., the content of the flask was stirred until the content became uniform. Thereafter, the flask was removed from the oil bath, the flask was left to cool until the temperature of the content reached 60° C. or lower, and the remaining raw materials were weighed and added to the flask. Subsequently, while the flask was heated in a water bath at 45° C. to 60° C., the content of the flask was stirred until the content became sufficiently uniform under visual inspection. Thus, epoxy resin compositions were obtained.

<Preparation of Resin Compositions of Comparative Examples 4, 5 and 8>

In a portion of the component (A), or/and a portion of a master batch of the component (A) and the component (C), the other raw materials were dispersed using a three-roll mill. The portion of the component (A), or/and the portion of the component (A) and the component (C), in which the other raw materials were dispersed, and the remaining portion of the component (A), or/and the remaining portion of the component (A) and the component (C) were weighed in a flask, and then while the flask was heated in a water bath at 45° C. to 60° C., the content of the flask was stirred until the raw materials fed to the flask became sufficiently uniform under visual inspection. Thus, epoxy resin compositions were obtained.

<Preparation of Resin Compositions of Comparative Examples 6 and 7>

In a portion of the component (A), or a portion of a master batch of the component (A) and the component (C), 2P4MHZ which was another raw material was dispersed using a three-roll mill. The portion of the component (A), or the master batch of the component (A) and the component (C), in which 2P4MHZ was dispersed, the remaining portion of the component (A), or the remaining portion of the master batch of the component (A) and the component (C), and HX-3722 which was another raw material, were weighed in a flask. Subsequently, while the flask was heated in a water bath at 45° C. to 60° C., the content of the flask was stirred until the raw materials fed to the flask became sufficiently uniform under visual inspection. Thus, epoxy resin compositions were obtained.

<Preparation of Resin Composition of Reference Example 1>

In jER828 as the component (A), other raw materials DICY7 and DCMU99 were dispersed using a three-roll mill. Furthermore, MX-113 which was a master batch of the component (A) and the component (C), and jER807 and YDF-2011 as the component (A) were weighed in a flask, and while the flask was heated in an oil bath at 120° C. to 130° C., the content of the flask was stirred until the content became uniform. Thereafter, the flask was removed from the oil bath, and the flask was left to cool until the temperature of the content reached 60° C. or lower. jER828 as the component (A) in which other raw materials DICY7 and DCMU99 were dispersed, was weighed and added to the flask. Subsequently, while the flask was heated in a water bath at 55° C. to 65° C., the content of the flask was stirred until the content became uniform. Thus, an epoxy resin composition was obtained.

<Preparation of Resin Composition of Reference Example 2>

The component (A) and the component (D) were weighed in a flask, and then while the flask was heated in an oil bath at 170° C. to 180° C., the content of the flask was stirred until the content became uniform. Thereafter, the flask was removed from the oil bath, the flask was left to cool until the temperature of the content reached 60° C., and the remaining raw materials were weighed and added to the flask. Subsequently, while the flask was heated in a water bath at 60° C. to 70° C., the content of the flask was stirred until the content became uniform. Thus, an epoxy resin composition was obtained.

Examples 8 to 11 and Comparative Examples 4 to 10

The various compositions described in Table 4 were prepared according to the Examples and Comparative Examples described above.

Pressure vessels were produced using the compositions thus obtained, by the method of <Production of composite material-reinforced pressure vessel>. However, a liner having a fiber-reinforced resin layer formed thereon was removed from the filament winding apparatus and suspended in an air heating furnace, and the temperature inside the furnace was increased to the curing temperature described in Table 4 at a rate of 2° C./min. After it was confirmed that the surface temperature of the fiber-reinforced resin layer reached the curing temperature, the temperature inside the furnace was maintained at the curing temperature for 2 hours, and thus the epoxy resin composition was cured.

For the pressure vessels thus obtained, the burst pressures were measured by the method of <Method for measuring burst pressure>. The results are presented in Table 4.

TABLE 4

| Raw material | | Example 8 | Example 9 | Example 10 | Example 11 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Master batch of component (A) and component (C) | MX-113 | 50 | 0 | 0 | 0 | 0 | 0 | 0 | 0 | 0 | 0 | 0 |
| | MX-154 | 0 | 50 | 0 | 50 | 0 | 0 | 0 | 0 | 50 | 0 | 0 |
| | BPF307 | 0 | 0 | 0 | 0 | 0 | 100 | 0 | 100 | 0 | 0 | 0 |
| Component (A) | jER828 | 50 | 50 | 0 | 50 | 100 | 0 | 100 | 0 | 50 | 50 | 100 |
| | CY184 | 0 | 0 | 0 | 0 | 0 | 0 | 0 | 0 | 0 | 50 | 0 |
| | 2021P | 0 | 0 | 100 | 0 | 0 | 0 | 0 | 0 | 0 | 0 | 0 |
| Component (B) | DY9577 | 7 | 7 | 0 | 0 | 0 | 0 | 0 | 0 | 0 | 8 | 0 |
| | ANCHOR | 0 | 0 | 10 | 10 | 0 | 0 | 0 | 0 | 0 | 0 | 10 |
| Others | DICY7 | 0 | 0 | 0 | 0 | 4 | 4 | 0 | 0 | 4 | 0 | 0 |
| | DCMU99 | 0 | 0 | 0 | 0 | 1.5 | 1.4 | 0 | 0 | 0 | 0 | 0 |
| | PN-23J | 0 | 0 | 0 | 0 | 0 | 0 | 0 | 0 | 2 | 0 | 0 |
| | MY-24 | 0 | 0 | 0 | 0 | 0 | 0 | 0 | 0 | 2 | 0 | 0 |
| | 2E4MZ | 0 | 0 | 0 | 0 | 0 | 0 | 0 | 0 | 4 | 0 | 0 |
| | 2P4MHZ | 0 | 0 | 0 | 0 | 0 | 0 | 8.7 | 8.7 | 0 | 0 | 0 |
| | HX-3722 | 0 | 0 | 0 | 0 | 0 | 0 | 5 | 5 | 0 | 0 | 0 |
| Component (C) | SRK-200E | 0 | 0 | 20 | 0 | 0 | 0 | 0 | 0 | 0 | 0 | 0 |
| Experiment | Component (C) per 100 parts by mass of epoxy resin | (parts by mass) | 19.8 | 25 | 20 | 25 | 0 | 20 | 0 | 20 | 25 | 0 | 0 |
| | Particle size of component (C) | (nm) | 100 | 100 | 100 | 100 | — | 300 | — | 300 | 100 | — | — |
| | Curing temperature | (° C.) | 110 | 110 | 110 | 110 | 135 | 135 | 135 | 135 | 110 | 110 | 150 |
| Evaluation results | Burst pressure (actual value) | (Mpa) | 42 | 43 | 41 | 38 | 32 | 33 | 31 | 31 | 34 | 34 | 32 |
| | Burst pressure (calculated value) | (Mpa) | 181 | 188 | 179 | 165 | 139 | 141 | 134 | 135 | 146 | 147 | 137 |

As can be seen from these Examples and Comparative Examples, when only the component (A): epoxy resin is used, or when the component (A): epoxy resin and the component (B): a boron halide-amine complex are used in combination, a pressure vessel exhibiting a sufficient burst pressure cannot be obtained. When the component (A): epoxy resin, the component (B): a boron halide-amine complex, and the component (C): rubber particles are used in combination, a pressure vessel exhibiting a sufficient burst pressure can be obtained.

Examples 12 to 18 and Comparative Examples 11 to 13

The various compositions described in Table 5 were prepared according to the Examples and Comparative Examples described above.

Cured plates were produced using the compositions thus obtained, according to the above section <Production of cured plate of epoxy resin composition>. For the cured plates thus obtained, G'-Tg was measured by the method of <Measurement of glass transition temperature of cured product>. The results are presented in Table 5.

The state of the cross-section of the cured plates was observed using the cured plates produced in this manner, by the method described in the following section <Observation of sea-island phase separation structure of cured product>.

<Observation of Sea-Island Phase Separation Structure of Cured Product>

A cured product was embedded in a embedding resin (manufactured by Nisshin EM Corp., TECHNOVIT 4000), and the cured product was polished using a polishing machine (manufactured by Refine Tech Co., Ltd., ADM-122). Thus, a cured product cross-section was obtained.

The cross-section of the cured product was observed by LSM (laser scan microscopy, "Nanosearch Laser Microscope LEXT3500" manufactured by Olympus Corp.), and images were taken after the conditions were adjusted to the magnification ratio and brightness enabling observation.

As can be seen from these Examples and Comparative Examples, when the amount of incorporation of the component (B): a boron halide-amine complex is adjusted to usually 8 parts by mass or more, preferably 9 parts by mass or more, and usually to 20 parts by mass or less, preferably 18 parts by mass or less, and more preferably 17 parts by mass or less, relative to 100 parts by mass of the component (A) included in the epoxy resin composition of the present invention, a cured product having a high G'–Tg value can be obtained.

Examples 19 to 34 and Comparative Example 14

The various compositions described in Table 6 were prepared according to the Examples and Comparative Examples described above.

Pressure vessels were produced using the compositions thus obtained, by the method of <Production of composite material-reinforced pressure vessel>. However, a liner having a fiber-reinforced resin layer formed thereon was removed from the filament winding apparatus and suspended in an air heating furnace, and the temperature inside the furnace was increased to the curing temperature described in Table 6 at a rate of 2° C./min. After it was confirmed that the surface temperature of the fiber-reinforced resin layer reached the curing temperature, the temperature inside the furnace was maintained at the curing temperature for 2 hours, and thus the epoxy resin composition was cured.

For the pressure vessels thus obtained, the burst pressures were measured by the method of <Method for measuring burst pressure>. The results are presented in Table 6.

Figure 3:
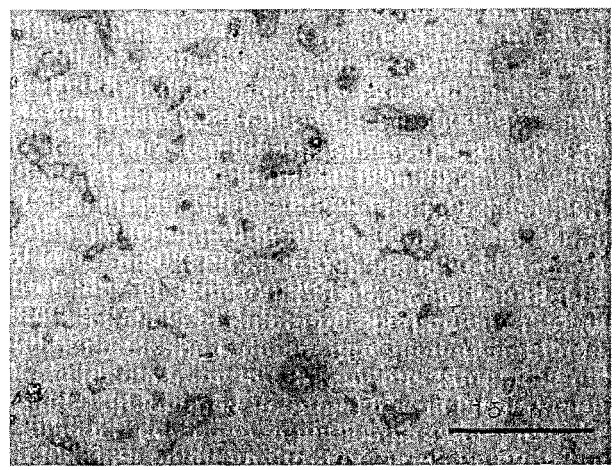
FIG. 3 is an LSM photograph showing the state of a sea-island phase separation structure of a cured product according to Examples of the present invention.

Meanwhile, for Example 19, an LSM photograph of a cross-section of the cured plate produced using the composition thus obtained is shown in FIG. 3.

TABLE 5

| Raw material | | Example 12 | Example 13 | Example 14 | Example 15 | Example 16 | Example 17 | Example 18 | Comparative Example 11 | Comparative Example 12 | Comparative Example 13 |
|---|---|---|---|---|---|---|---|---|---|---|---|
| Master batch of component (A) and component (C) | MX-154 | 100 | 0 | 100 | 100 | 100 | 0 | 100 | 0 | 0 | 100 |
| | MX-113 | 0 | 75 | 0 | 0 | 0 | 75 | 0 | 75 | 50 | 0 |
| Component (A) | jER828 | 0 | 25 | 0 | 0 | 0 | 25 | 0 | 25 | 50 | 0 |
| Component (B) | DY9577 | 5 | 6.5 | 6.5 | 8 | 10 | 15 | 12 | 5 | 6 | 15 |
| Component (D) | M52N | 0 | 7 | 0 | 0 | 0 | 7 | 0 | 7 | 7 | 0 |
| Component (B) per 100 parts by mass of epoxy resin | (parts by mass) | 8.3 | 8.7 | 10.8 | 13.3 | 16.7 | 20.0 | 20.0 | 6.7 | 7.2 | 25.0 |
| Experiment Curing temperature | (° C.) | 110 | 110 | 110 | 110 | 110 | 110 | 110 | 110 | 110 | 110 |
| Evaluation results G'-Tg | (° C.) | 94 | 98 | 105 | 107 | 108 | 92 | 97 | 80 | 89 | 87 |
| Presence or absence of sea-island-island phase separation | | Absent | Present | Absent | Absent | Absent | Present | Absent | Present | Present | Absent |

TABLE 6

| Raw material | | Example 19 | Example 20 | Example 21 | Example 22 | Example 23 | Example 24 | Example 25 | Example 26 | Example 27 | Example 28 | Example 29 | Example 30 | Example 31 | Example 32 | Example 33 | Example 34 | Comparative Example 14 |
|---|---|---|---|---|---|---|---|---|---|---|---|---|---|---|---|---|---|---|
| Master batch of component (A) and component (C) | MX-125 | 0 | 0 | 0 | 0 | 0 | 0 | 0 | 0 | 0 | 0 | 0 | 0 | 0 | 0 | 100 | 0 | 0 |
| | MX-113 | 33 | 50 | 50 | 0 | 0 | 0 | 0 | 0 | 0 | 75 | 33 | 0 | 100 | 0 | 0 | 33 | 0 |
| | MX-154 | 0 | 0 | 0 | 0 | 0 | 0 | 0 | 0 | 100 | 0 | 0 | 50 | 0 | 0 | 0 | 0 | 0 |
| | MX-416 | 17 | 0 | 0 | 0 | 0 | 0 | 0 | 0 | 0 | 0 | 0 | 0 | 0 | 67 | 0 | 17 | 0 |
| | MX-960 | 0 | 0 | 0 | 0 | 0 | 0 | 0 | 0 | 0 | 0 | 0 | 0 | 0 | 0 | 0 | 0 | 0 |
| | BPA328 | 0 | 0 | 0 | 0 | 0 | 0 | 0 | 100 | 0 | 0 | 0 | 0 | 0 | 0 | 0 | 0 | 0 |
| Component (A) | CY184 | 50 | 50 | 50 | 100 | 100 | 100 | 100 | 0 | 0 | 0 | 50 | 50 | 0 | 0 | 0 | 50 | 50 |
| | jER828 | 0 | 0 | 0 | 0 | 0 | 0 | 0 | 0 | 0 | 25 | 17 | 0 | 0 | 33 | 0 | 0 | 50 |
| Component (B) | DY9577 | 10 | 7 | 10 | 12 | 12 | 12 | 12 | 8.3 | 10 | 10 | 8 | 7 | 10 | 10 | 10 | 10 | 8 |
| Component (C) | J-5800 | 0 | 0 | 0 | 20 | 0 | 0 | 0 | 0 | 0 | 0 | 0 | 0 | 30 | 0 | 54 | 0 | 0 |
| | W-5500 | 0 | 0 | 0 | 0 | 20 | 0 | 0 | 0 | 0 | 0 | 0 | 0 | 0 | 0 | 0 | 0 | 0 |
| | SRK-200E | 0 | 0 | 0 | 0 | 0 | 20 | 0 | 0 | 0 | 0 | 0 | 0 | 0 | 0 | 0 | 0 | 0 |
| | AC-4030 | 0 | 0 | 0 | 0 | 0 | 0 | 20 | 0 | 0 | 0 | 0 | 0 | 0 | 0 | 0 | 0 | 0 |
| Component (D) | M52N | 7 | 7 | 0 | 0 | 0 | 0 | 0 | 0 | 0 | 0 | 0 | 0 | 0 | 0 | 0 | 0 | 0 |
| | TPAE-32 | 0 | 0 | 0 | 0 | 0 | 0 | 0 | 0 | 7 | 7 | 0 | 0 | 0 | 0 | 0 | 7 | 0 |
| Experiment | Component (B) per 100 parts by mass of epoxy resin (parts by mass) | 11.8 | 8.4 | 12.0 | 12.0 | 12.0 | 12.0 | 12.0 | 8.3 | 16.7 | 13.3 | 9.0 | 8.8 | 14.9 | 12.0 | 13.3 | 11.8 | 8.0 |
| | Component (C) per 100 parts by mass of epoxy resin (parts by mass) | 17.8 | 19.8 | 19.8 | 20.0 | 20.0 | 20.0 | 20.0 | 20.0 | 66.7 | 32.9 | 12.2 | 25.0 | 94.0 | 20.1 | 105.3 | 17.8 | 0.0 |
| | Particle size of component (C) (nm) | 100 | 100 | 100 | 700 | 600 | 300 | 400 | 300 | 100 | 100 | 100 | 100 | 100 700 | 300 | 100 700 | 100 | 0 |
| | Curing temperature (°C) | 135 | 110 | 110 | 110 | 110 | 110 | 110 | 110 | 110 | 110 | 110 | 110 | 110 | 110 | 110 | 110 | 110 |
| Evaluation results | Burst pressure (actual value) (Mpa) | 42 | 42 | 39 | 37 | 37 | 37 | 38 | 39 | 41 | 40 | 37 | 43 | 39 | 37 | 36 | 41 | 34 |
| | Burst pressure (calculated value) (Mpa) | 181 | 181 | 169 | 161 | 161 | 159 | 165 | 170 | 178 | 173 | 160 | 188 | 167 | 160 | 156 | 178 | 147 |
| | Presence or absence of sea-island phase separation | Present | Absent | Absent | Absent | Absent | Absent | Absent | Absent | Absent | Present | Absent | Absent | Absent | Absent | Absent | — | Absent |

As can be seen from these Examples and Comparative Examples, when the epoxy resin composition of the present inventions are used, pressure vessels exhibiting high burst pressures can be obtained.

Examples 35 to 37 and Reference Examples 1 and 2

The various compositions described in Table 7 were prepared according to the Examples and Comparative Examples described above.

(Meanwhile, the epoxy resin compositions of Example 35 and Example 1, Example 36 and Example 28, and Example 37 and Example 27 are the same compositions.)

Tow prepregs were produced using the epoxy resin compositions thus obtained, according to the <Production of tow prepreg>, and pressure vessels were produced according to the <Production of composite material-reinforced pressure vessel>.

At the time of the <Production of composite material-reinforced pressure vessel>, <Evaluation of reelability of tow prepreg> and <Evaluation of processability of tow prepreg> as described below were carried out.

<Evaluation of Reelability of Tow Prepreg>

Upon the production of a pressure vessel, when there was a problem of filament breakage that single fibers (filaments) of the reinforcing fiber bundle were entangled with the epoxy resin composition on the bobbin and were broken, the sample was rated as "B (unacceptable reelability)"; and when there was no such problem, the sample was rated as "A (acceptable reelability)".

<Evaluation of Processability of Tow Prepreg>

Upon production of a pressure vessel, when fluff generation was confirmed on the tow prepreg surface due to scraping with the guide roll or the like, the sample was rated as "B (unacceptable processability)"; and when no fluff generation was confirmed, the sample was rated as "A (acceptable processability)".

Furthermore, cured plates were produced using the epoxy resin compositions thus obtained, in the same manner as in Examples 12 to 18 and Comparative Examples 11 to 13, and the surface state was observed. The results are presented in Table 7.

When the viscosity of the epoxy resin composition used was adjusted to 300 Pa·s or less, a tow prepreg having excellent reelability and processability could be obtained. Furthermore, since the viscosity of the epoxy resin composition of Reference Example 1 was 300 Pa·s or less, the tow prepreg had excellent reelability and processability; however, it should be noted that since the component (B) was different from that of the present invention, the burst pressure of the pressure vessel was insufficient.

Example 38 and Comparative Example 15

Example Corresponding to Second Embodiment of Present Invention

The various compositions described in Table 8 were prepared according to the Examples and Comparative Examples described above.

Tow prepregs were produced using the epoxy resin compositions thus obtained, according to the <Production of tow prepreg>, and pressure vessels were produced according to the <Production of composite material-reinforced pressure vessel>.

For the pressure vessels thus obtained, the burst pressure was measured by the method of <Method for measuring burst pressure>.

Furthermore, cured plates were produced using the epoxy resin compositions thus obtained, in the same manner as in Examples 12 to 18 and Comparative Examples 11 to 13, and the surface state was observed.

These results are presented in Table 8.

TABLE 7

| Raw material | | Example 35 | Example 36 | Example 37 | Reference Example 1 | Reference Example 2 |
|---|---|---|---|---|---|---|
| Master batch of component (A) and component (C) | MX-113 | 33 | 75 | 0 | 30 | 30 |
| | MX-154 | 0 | 0 | 100 | 0 | 0 |
| | MX-416 | 17 | 0 | 0 | 0 | 0 |
| Component (A) | jER828 | 0 | 25 | 0 | 40 | 0 |
| | jER807 | 0 | 0 | 0 | 15 | 40 |
| | YDF-2001 | 0 | 0 | 0 | 15 | 30 |
| | CY184 | 50 | 0 | 0 | 0 | 0 |
| Component (B) | DY9577 | 10 | 10 | 10 | 0 | 8 |
| Others | DICY7 | 0 | 0 | 0 | 4.2 | 0 |
| | DCMU99 | 0 | 0 | 0 | 2.8 | 0 |
| Component (D) | YP50S | 0 | 0 | 0 | 5 | 10 |
| | M52N | 7 | 7 | 0 | 0 | 0 |
| Epoxy resin content of tow prepreg | (mass %) | 24 | 24 | 24 | 24 | 24 |
| Evaluation results | Viscosity @ 30° C. (Pa·s) | 16 | 110 | 34 | 280 | 1100 |
| | Reelability of tow prepreg | A | A | A | A | B |
| | Processability of tow prepreg | A | A | A | A | B |
| | Burst pressure (actual value) (Mpa) | 42 | 40 | 41 | 35 | — |
| | Burst pressure (calculated value) (Mpa) | 182 | 173 | 178 | 153 | — |
| | Presence or absence of sea-island-island phase separation | Present | Present | Absent | Absent | Absent |

TABLE 8

|  | Raw material |  | Comparative Example 15 | Example 38 |
|---|---|---|---|---|
| Experiment | Component (A) | jER828 | 50 | 50 |
|  |  | CY184 | 50 | 50 |
|  | Component (B) | DY9577 | 10 | 10 |
|  | Component (D) | M52N | 10 | 20 |
|  | Component (B) per 100 parts by mass of epoxy resin | (parts by mass) | 10 | 10 |
|  | Component (D) per 100 parts by mass of epoxy resin | (parts by mass) | 10 | 20 |
| Evaluation results | Curing temperature | (° C.) | 110 | 110 |
|  | Burst pressure (actual value) | (Mpa) | 35 | 39 |
|  | Burst pressure (calculated value) | (Mpa) | 153 | 167 |
|  | Presence or absence of sea-island-island phase separation |  | Present | Present |

INDUSTRIAL APPLICABILITY

According to the present invention, an epoxy resin composition which has excellent storage stability, produces a cured product having excellent heat resistance and toughness, and can be suitably used in direct molding such as FW molding as well as in intermediate materials such as a tow prepreg; a tow prepreg having excellent reelability, processability and drape properties; and a pressure vessel having high pressure resistance performance, can be provided. Therefore, the present invention is industrially highly useful.

The invention claimed is:

1. An epoxy resin composition, comprising:
 components (A1), (B1) and (C1), wherein a content of the component (B1) is 10.8 to 16.7 parts by mass relative to 100 parts by mass of the component (A1), and a content of the component (C1) is 12 to 110 parts by mass relative to 100 parts by mass of the component (A1),
 wherein component (A1) is an epoxy resin selected from the group consisting of an epoxy resin comprising an aromatic ring in the molecule, and an epoxy resin comprising an aliphatic ring in the molecule,
 component (B1) is a boron trihalide-amine complex, and
 component (C1) is a rubber particle selected from the group consisting of
 a crosslinked rubber particle, and
 a core-shell type rubber particle, wherein the core-shell type rubber particle comprises:
 a crosslinked rubber particle and a polymer graft-polymerized on the surface of the crosslinked rubber particle, wherein the graft polymerized polymer is different from a polymer that constitutes the crosslinked rubber particle,
 wherein the epoxy resin composition has a glass transition temperature (G'-Tg) when cured at 110° C. of at least 105° C.

2. The epoxy resin composition according to claim 1, wherein the viscosity at 30° C. is from 0.1 Pa·s to 300 Pa·s.

3. The epoxy resin composition according to claim 1, wherein the particle size of the component (C1) in a cured product of the epoxy resin composition is 400 nm or less.

4. The epoxy resin composition according to claim 1, wherein the component (C1) is a rubber particle comprising a butadiene rubber.

5. The epoxy resin composition according to claim 1, further comprising component (D1), wherein component (D1) is a polymer which is compatible with an epoxy resin composition comprising the components (A1), (B1) and (C1), wherein the epoxy resin composition comprising component (D1) has a characteristic of forming a phase separation structure when cured.

6. The epoxy resin composition according to claim 1, wherein the component (B1) is a boron trichloride-amine complex.

7. The epoxy resin composition according to claim 1, wherein the component (A1) is at least one selected from the group consisting of an epoxy resin comprising an aromatic ring in the molecule, and hexahydrophthalic acid diglycidyl ester.

8. An epoxy resin composition, comprising:
 components (A2), (B2) and (D2), wherein a content of the component (B2) is 10.8 to 16.7 parts by mass relative to 100 parts by mass of the component (A2), and a content of the component (D2) is 1 to 50 parts by mass relative to 100 parts by mass of the component (A2),
 wherein component (A2) is an epoxy resin, component (B2) is a boron trihalide-amine complex, component (D2) is a polymer which is compatible with an epoxy resin composition comprising the components (A2) and (B2),
 wherein the epoxy resin composition comprising component (D2) has a characteristic of forming a phase separation structure when cured, and
 wherein the epoxy resin composition has a glass transition temperature (G'-Tg) when cured at 110° C. of at least 105° C.

9. The epoxy resin composition according to claim 1, further comprising:
 a thermoplastic resin;
 wherein the epoxy resin composition has a characteristic of forming, when cured, a phase separation structure 1 in which a phase of a cured product of the epoxy resin composition and a phase of the thermoplastic resin constitute a sea-island phase separation structure in the cured product, and a phase separation structure 2 which is a sea-island phase separation structure, by taking the island structure in the phase separation structure 1 as a sea structure.

10. The epoxy resin composition according to claim 9, wherein the content of the thermoplastic resin is 1 to 50 parts by mass relative to 100 parts by mass of the epoxy resin.

11. The epoxy resin composition according to claim 9, wherein the sea structure in the phase separation structure 1 is a phase of a cured product of the epoxy resin, and the island structure is a phase of the thermoplastic resin.

12. A tow prepreg, obtained by impregnating a reinforcing fiber bundle with the epoxy resin composition according to claim 1.

13. A composite material-reinforced pressure vessel, produced from the tow prepreg according to claim 12.

14. A composite material-reinforced pressure vessel, produced by filament winding molding with a reinforced fiber bundle impregnated with the epoxy resin composition according claim 1.

15. A tendon, produced from a composite material formed from the tow prepreg according to claim 12.

16. A tow prepreg, obtained by impregnating a reinforcing fiber bundle with the epoxy resin composition according to claim 8.

17. A composite material-reinforced pressure vessel, produced from the tow prepreg according to claim 16.

18. A composite material-reinforced pressure vessel, produced by filament winding molding with a reinforced fiber bundle impregnated with the epoxy resin composition according claim 8.

19. A tendon, produced from a composite material formed from the tow prepreg according to claim 16.

20. The epoxy resin composition according to claim 8, wherein the component (D2) is a thermoplastic resin, and
the epoxy resin composition has a characteristic of forming, when cured, a phase separation structure 1 in which a phase of a cured product of the epoxy resin composition and a phase of the polymer constitute a sea-island phase separation structure in the cured product, and a phase separation structure 2 which is a sea-island phase separation structure, by taking the island structure in the phase separation structure 1 as a sea structure.

21. The epoxy resin composition according to claim 20, wherein the sea structure in the phase separation structure 1 is a phase of a cured product of the epoxy resin, and the island structure is a phase of the thermoplastic resin.

22. A tow prepreg obtained by impregnating a reinforcing fiber bundle with epoxy resin composition, comprising:
components (A1), (B1) and (C1), wherein a content of the component (B1) is 10.8 to 16.7 parts by mass relative to 100 parts by mass of the component (A1), and a content of the component (C1) is 12 to 110 parts by mass of the component (A1),
wherein component (A1) is an epoxy resin selected from the group consisting of an epoxy resin comprising an aromatic ring in the molecule and an epoxy resin comprising an aliphatic ring in the molecule,
component (B1) is a boron trihalide-amine complex, and
component (C1) is a rubber particle selected from the group consisting of
a crosslinked rubber particle and
a core-shell type rubber particle, wherein the core-shell type rubber particle comprises
a cross-linked rubber particle and a polymer graft-polymerized on the surface of the crosslinked rubber particle, wherein the graft polymerized polymer is different from a polymer that constitutes the cross-linked rubber particle,
wherein the epoxy resin composition has a glass transition temperature (G'-Tg) when cured at 110° C. of at least 105° C.

23. The tow prepreg according to claim 22, wherein the epoxy resin has the viscosity at 30° C. ranging from 0.1 Pa·s to 300 Pa·s.

24. The tow prepreg according to claim 22, wherein the particle size of the component (C1) in a cured product of the epoxy resin composition is 400 nm or less.

25. The tow prepreg according to claim 22, wherein the component (C1) is rubber particles containing at least butadiene rubber.

26. The tow prepreg according to claim 22, further comprising component (D1): wherein component (D1) is a polymer which is compatible with an epoxy resin composition containing the components (A1), (B1), and (C1), wherein the epoxy resin composition comprising component (D1) has a characteristic of forming a phase separation structure when cured.

27. The tow prepreg according to claim 22, wherein the component (B1) is a boron trichloride-amine complex.

28. The tow prepreg according to claim 22, wherein the component (A1) is at least one selected from the group consisting of an epoxy resin comprising an aromatic ring in the molecule, and hexahydrophthalic acid diglycidyl ester.

* * * * *